(12) United States Patent　　　　　(10) Patent No.:　US 12,598,089 B2

Winarski　　　　　　　　　　　　　　(45) Date of Patent:　　　Apr. 7, 2026

(54) BLOCKCHAIN ZIPPER ENCRYPTED PACKAGE

(71) Applicant: Tyson York Winarski, Mountain View, CA (US)

(72) Inventor: Tyson York Winarski, Mountain View, CA (US)

( * ) Notice: Subject to any disclaimer, the term of this patent is extended or adjusted under 35 U.S.C. 154(b) by 86 days.

(21) Appl. No.: 18/237,223

(22) Filed: Aug. 23, 2023

(65) Prior Publication Data

US 2024/0089129 A1　　　Mar. 14, 2024

Related U.S. Application Data

(60) Provisional application No. 63/405,868, filed on Sep. 13, 2022.

(51) Int. Cl.
　H04L 9/00　　　　(2022.01)
　H04L 9/30　　　　(2006.01)
(52) U.S. Cl.
　CPC .............. H04L 9/50 (2022.05); H04L 9/3033 (2013.01)
(58) Field of Classification Search
　CPC . H04L 9/50; H04L 9/3033; H04L 9/14; H04L 9/0637; H04L 9/3236; H04L 9/3247; G06F 21/602
　See application file for complete search history.

(56) References Cited

U.S. PATENT DOCUMENTS

| | | | | |
|---|---|---|---|---|
| 10,084,600 | B1 * | 9/2018 | Irwan | H04L 63/08 |
| 10,708,046 | B1 * | 7/2020 | Ashrafi | H04L 9/0852 |
| 11,323,247 | B2 * | 5/2022 | Kuang | H04L 9/065 |
| 11,763,383 | B2 * | 9/2023 | Sako | G06Q 40/04 |
| | | | | 705/37 |
| 11,824,991 | B2 * | 11/2023 | Fiske | H04L 9/0852 |
| 11,973,889 | B2 * | 4/2024 | Han | H04L 9/008 |
| 12,192,378 | B2 * | 1/2025 | Li | H04L 9/3247 |
| 2022/0045840 | A1 * | 2/2022 | Honorio Araujo da Silva | |
| | | | | H04L 9/3033 |

* cited by examiner

*Primary Examiner* — Hosuk Song
(74) *Attorney, Agent, or Firm* — The Winarski Firm, PLLC

(57)　　　　　　　　ABSTRACT

The present specification discloses a blockchain zipper encrypted package. The blockchain zipper encrypted package is formed of a dual blockchain structure where the two blockchains are logically interlocked in order to form a zipper encrypted package. One of the two blockchains is a data blockchain that contains data. The data contained by the data blockchain can be any form of data: financial data, medical data, business data, technical data, software data, informational data, executable data, and data in the form of: emails, spreadsheets, documents, photographs, media, images, photos, video, music, or any kind of file. The other of the two blockchains is a public key encryption blockchain that contains prime numbers used to encrypt and decrypt the data blockchain. Public key encryption requires two prime numbers. These two prime numbers are stored in different blockchain blocks that are adjacent to each other according to the present specification.

20 Claims, 20 Drawing Sheets

Blockchain Zipper Encrypted Package 8

Data Blockchain 10

Key 32　　Key 34　　Key 36　　Key 38

Public Key Encryption Blockchain 20

Blockchain Zipper Encrypted
Package 8

Data Blockchain 10

Key 32     Key 34     Key 36     Key 38

Public Key Encryption
Blockchain 20

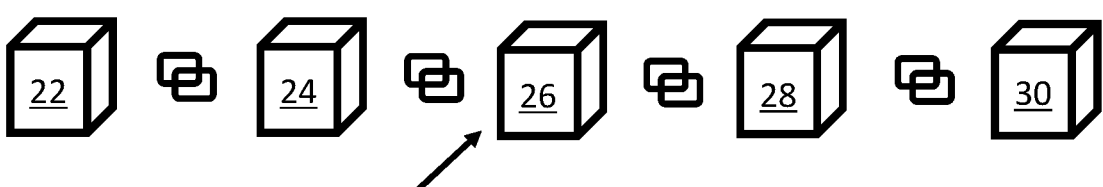

Public Key Encryption
Blockchain 20

| PUBLIC KEY ENCRYPTION BLOCKCHAIN GENESIS BLOCK 22 | INFORMATION IN BLOCK:<br>*Metadata linking to a particular Data Blockchain<br>*Blockchain Data: Prime Number p<br>*Blockchain Metadata: Metadata wrapper 100 (blockchain hash digest of block 22) |
|---|---|

| PUBLIC KEY ENCRYPTION BLOCKCHAIN BLOCK 24 | INFORMATION IN BLOCK:<br>*Blockchain Data: Prime Number q<br>*Blockchain Metadata: Metadata wrapper 100 (blockchain hash digest of block 22 [prior block] and blockchain hash digest of block 24 [current block]) |
|---|---|

| PUBLIC KEY ENCRYPTION BLOCKCHAIN BLOCK 26 | INFORMATION IN BLOCK:<br>*Blockchain Data: Prime Number r<br>*Blockchain Metadata: Metadata wrapper 100 (blockchain hash digest of block 24 [prior block] and blockchain hash digest of block 26 [current block]) |
|---|---|

| PUBLIC KEY ENCRYPTION BLOCKCHAIN BLOCK 28 | INFORMATION IN BLOCK:<br>*Blockchain Data: Prime Number s<br>*Blockchain Metadata: Metadata wrapper 100 (blockchain hash digest of block 26 [prior block] and blockchain hash digest of block 28 [current block]) |
|---|---|

| PUBLIC KEY ENCRYPTION BLOCKCHAIN BLOCK 30 | INFORMATION IN BLOCK:<br>*Blockchain Data: Prime Number t<br>*Blockchain Metadata: Metadata wrapper 100 (blockchain hash digest of block 28 [prior block] and blockchain hash digest of block 30 [current block]) |
|---|---|

FIG. 5

Key 32

Modulus N_0 = (2p+1)*(2q+1)
Euler Totient $\phi(N\_0) = 2pq$
$1 < E\_0 < \phi(N\_0)$ coprime to $\phi(N\_0)$
S_Block_0 = $(Block\_0)^{E\_0}$ mod(N_0)
D_0*E_0 = 1 mod[$\phi(N\_0)$]
Block_0 = S_Block_$0^{D\_0}$ mod(N_0)

Key 34

Modulus N_1 = (2q+1)*(2r+1)
Euler Totient $\phi(N\_1) = 2qr$
$1 < E\_1 < \phi(N\_1)$ coprime to $\phi(N\_1)$
S_Block_1 = $(Block\_1)^{E\_1}$ mod(N_1)
D_1*E_1 = 1 mod[$\phi(N\_1)$]
Block_1 = S_Block_$1^{D\_1}$ mod(N_1)

Key 36

Modulus N_2 = (2r+1)*(2s+1)
Euler Totient φ(N_2) = 2rs
1 < E_2 < φ(N_2) coprime to φ(N_2)
S_Block_2 = (Block_2)$^{E\_2}$ mod(N_2)
D_2*E_2 = 1 mod[φ(N_2)]
Block_2 = S_Block_2$^{D\_2}$ mod(N_2)

Key 38

Modulus N_3 = (2s+1)*(2t+1)
Euler Totient φ(N_3) = 2st
1 < E_3 < φ(N_3) coprime to φ(N_3)
S_Block_3 = (Block_3)$^{E\_3}$ mod(N_3)
D_3*E_3 = 1 mod[φ(N_3)]
Block_3 = S_Block_3$^{D\_3}$ mod(N_3)

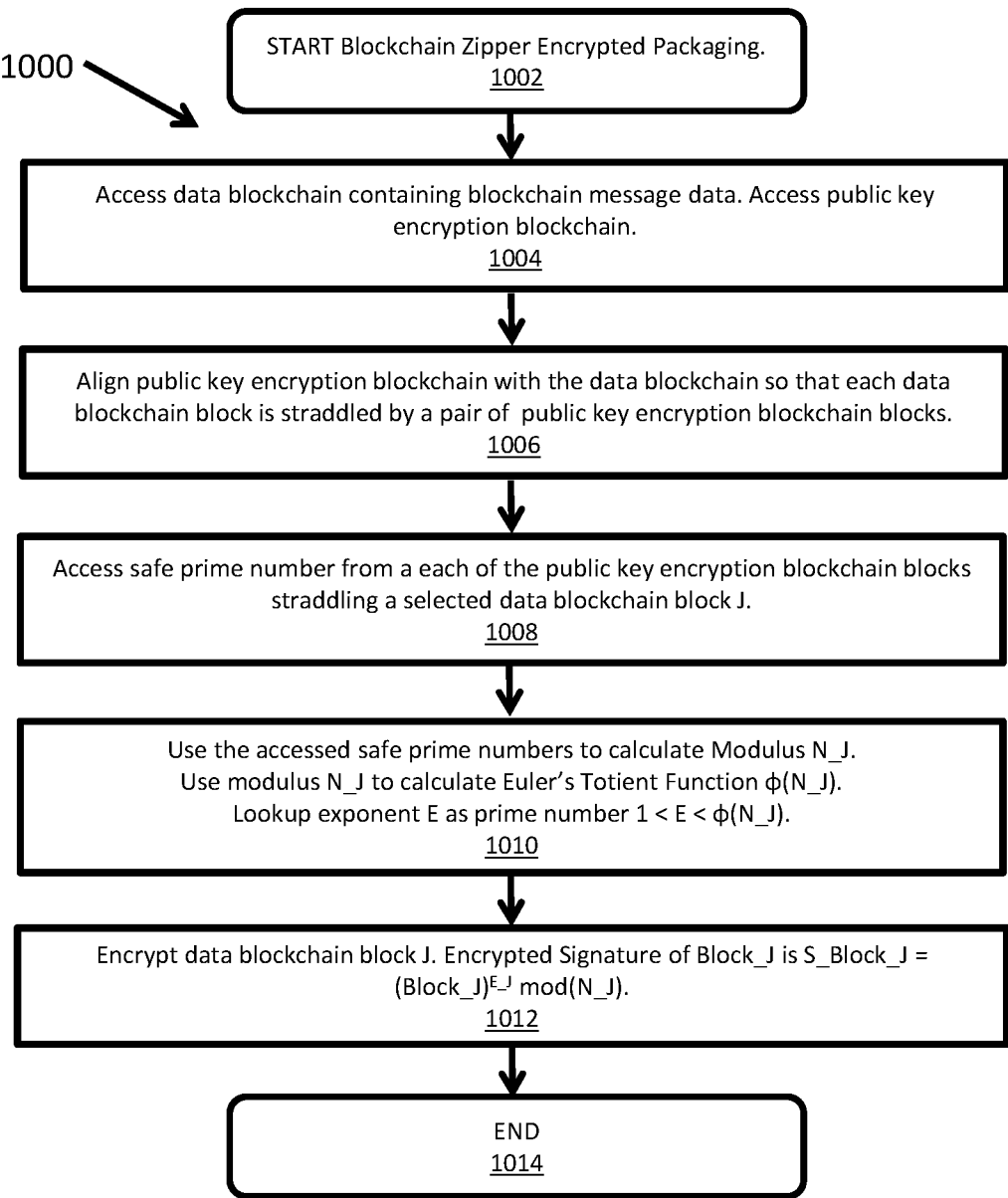

1000

START Blockchain Zipper Encrypted Packaging.
1002

Access data blockchain containing blockchain message data. Access public key encryption blockchain.
1004

Align public key encryption blockchain with the data blockchain so that each data blockchain block is straddled by a pair of public key encryption blockchain blocks.
1006

Access safe prime number from a each of the public key encryption blockchain blocks straddling a selected data blockchain block J.
1008

Use the accessed safe prime numbers to calculate Modulus N_J.
Use modulus N_J to calculate Euler's Totient Function $\phi$(N_J).
Lookup exponent E as prime number 1 < E < $\phi$(N_J).
1010

Encrypt data blockchain block J. Encrypted Signature of Block_J is S_Block_J = (Block_J)$^{E\_J}$ mod(N_J).
1012

END
1014

FIG. 10

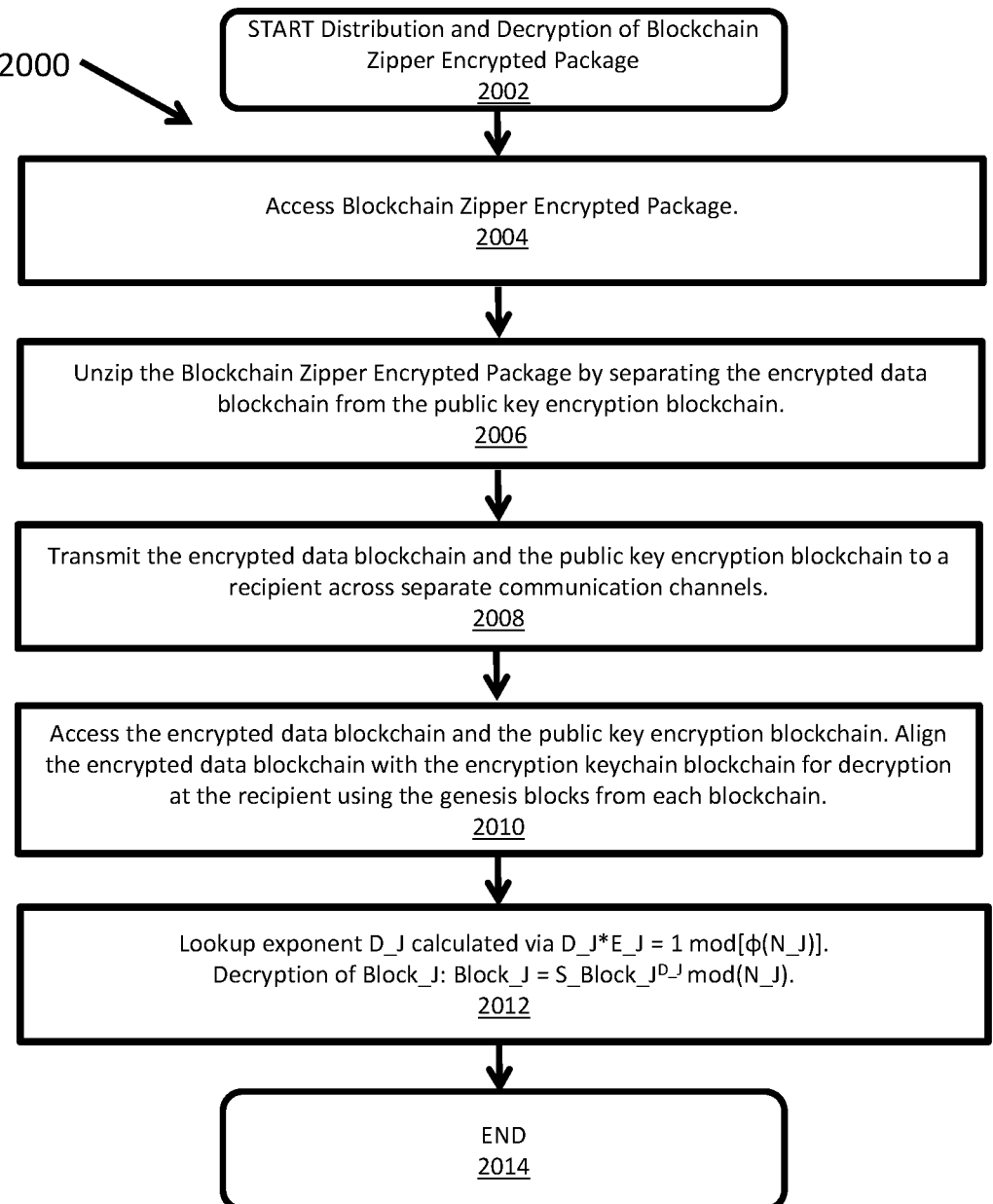

2000

START Distribution and Decryption of Blockchain
Zipper Encrypted Package
2002

Access Blockchain Zipper Encrypted Package.
2004

Unzip the Blockchain Zipper Encrypted Package by separating the encrypted data
blockchain from the public key encryption blockchain.
2006

Transmit the encrypted data blockchain and the public key encryption blockchain to a
recipient across separate communication channels.
2008

Access the encrypted data blockchain and the public key encryption blockchain. Align
the encrypted data blockchain with the encryption keychain blockchain for decryption
at the recipient using the genesis blocks from each blockchain.
2010

Lookup exponent D_J calculated via D_J*E_J = 1 mod[φ(N_J)].
Decryption of Block_J: Block_J = S_Block_J$^{D\_J}$ mod(N_J).
2012

END
2014

| Sophie Germain Primes <u>131</u> | *.DOC <u>132</u> | *.MPG <u>133</u> | *.JPG <u>134</u> | *.XLS <u>135</u> | *.PDF <u>136</u> |
|---|---|---|---|---|---|
| First Pair | a<br>2a+1 | f<br>2f+1 | k<br>2k+1 | p<br>2p+1 | u<br>2u+1 |
| Second Pair | b<br>2b+1 | g<br>2g+1 | l<br>2l+1 | q<br>2q+1 | v<br>2v+1 |
| Third Pair | c<br>2c+1 | h<br>2h+1 | m<br>2m+1 | r<br>2r+1 | w<br>2w+1 |
| Fourth Pair | d<br>2d+1 | i<br>2i+1 | n<br>2n+1 | s<br>2s+1 | x<br>2x+1 |
| Fifth Pair | e<br>2e+1 | j<br>2j+1 | o<br>2o+1 | t<br>2t+1 | y<br>2y+1 |

| Example Sophie Germain Prime Pairs 141 | Modulus N 142 | Euler's Totient Function φ(N) 143 | Encryption Exponent E 1 < E < φ(N) 144 | Decryption Exponent D D*E = 1 mod[φ(N)] E*D - φ(N)*Y = 1 145 |
|---|---|---|---|---|
| p = 1973  2p+1 = 3947  q = 2003  2q+1 = 4007 | N_0 = 2p+1*2q+1  3947*4007 = 15815629 | φ(N_0)=2pq  2*1973*2003 = 7903838 | E_0 = 47 | 47*D_0 - 7903838Y = 1 Y = -17 - 47K K = -1 gives Y = 30 D_0 = 5045003 |
| r = 2039  2r+1 = 4079 | N_1 = 2q+1*2r+1  4007*4079 = 16344553 | φ(N_1)=2qr  2*2003*2039 = 8168234 | E_1 = 53 | 53*D_1 - 8168234Y = 1 Y = 8 - 53K K = 0 gives Y = 8 D_1 = 1232941 |
| s = 2063  2s+1 = 4127 | N_2 = 2r+1*2s+1  4079*4127 = 16834033 | φ(N_2)=2rs  2*2039*2063 = 8412914 | E_2 = 59 | 59*D_2 - 8412914Y = 1 Y = -21 - 59K K = -1 gives Y = 38 D_2 = 5418487 |
| t = 2069  2t+1 = 4139 | N_3 = 2s+1*2t+1  4127*4139 = 17081653 | φ(N_3)=2st  2*2063*2069 = 8536694 | E_3 = 61 | 61*D_3 - 8536694Y = 1 Y = -5 - 61K K = -1 gives Y = 56 D_3 = 7836965 |

FIG. 13

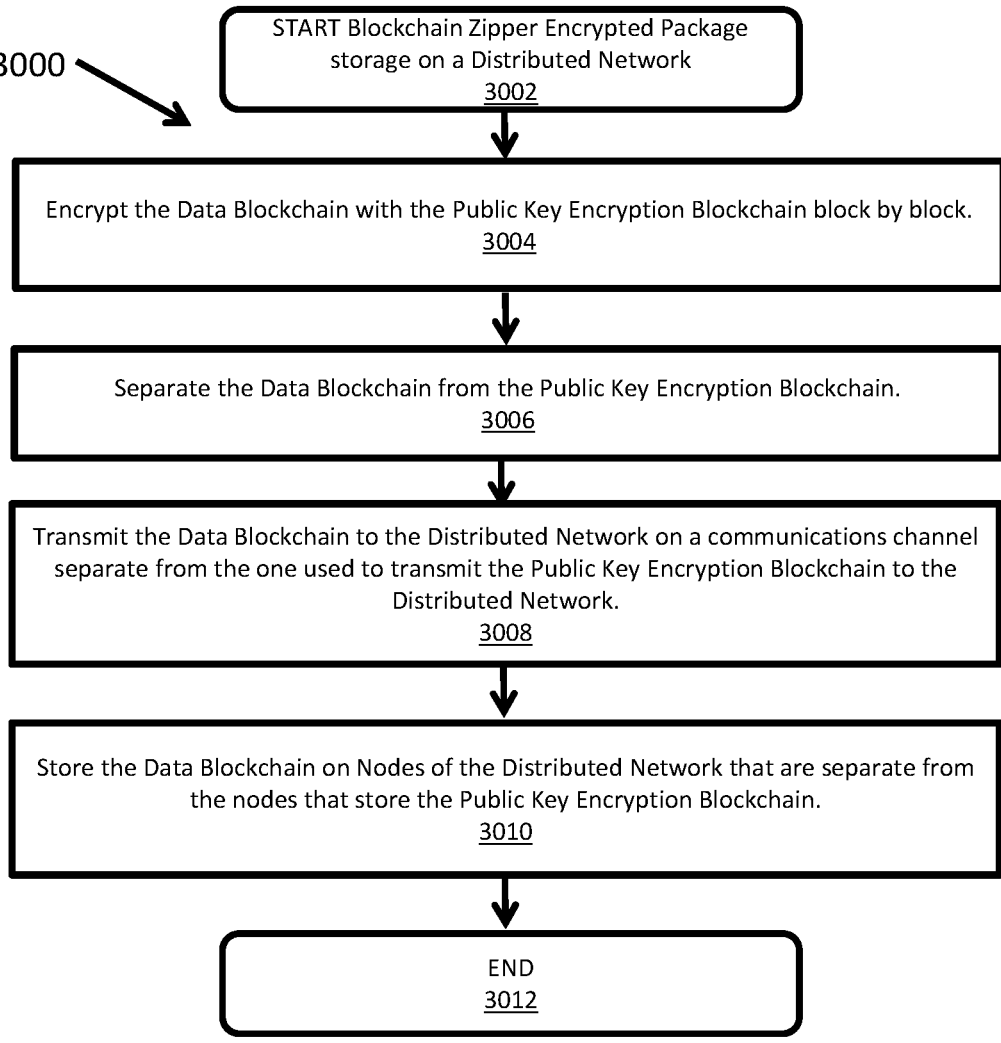

3000

START Blockchain Zipper Encrypted Package
storage on a Distributed Network
3002

Encrypt the Data Blockchain with the Public Key Encryption Blockchain block by block.
3004

Separate the Data Blockchain from the Public Key Encryption Blockchain.
3006

Transmit the Data Blockchain to the Distributed Network on a communications channel
separate from the one used to transmit the Public Key Encryption Blockchain to the
Distributed Network.
3008

Store the Data Blockchain on Nodes of the Distributed Network that are separate from
the nodes that store the Public Key Encryption Blockchain.
3010

END
3012

FIG. 16

| Blockchain Metadata Wrapper 100 | | | |
|---|---|---|---|
| Blockchain Information 102 | Hash Digest Types 104 | Hash Digests 106 | Data Contents (file names) 108 |
| Block Identifying ID<br><br>GENESIS BLOCKCHAIN BLOCKS ONLY: Metadata interlinking a data blockchain 10 to a public key encryption blockchain 20 | MD5, SHA-1, SHA-224, SHA-512/224, SHA-256, SHA-512/256, SHA-384, SHA-512, or SHA-3 | 79054025<br>255FB1A2<br>6E4BC422<br>AEF54EB4 | SPREADSHEET<br>FINANCIAL<br>RECORDS<br>EMAIL<br>SOFTWARE<br>MEDIA |

FIG. 18

1900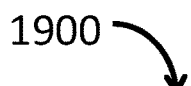

| Descriptor<br>1901 | Hexadecimal Value<br>1902 |
|---|---|
| Blockchain Data<br>Block B1<br>(64-Bytes)<br><br>1903 | 4dc968ff 0ee35c20 9572d477 7b721587<br>d36fa7b2 1bdc56b7 4a3dc078 3e7b9518<br>afbfa200 a8284bf3 6e8e4b55 b35f4275<br>93d84967 6da0d155 5d8360fb 5f07fea2<br>1904 |
| Blockchain Data<br>Block B2<br>(64-Bytes)<br><br>1905 | 4dc968ff 0ee35c20 9572d477 7b721587<br>d36fa7b2 1bdc56b7 4a3dc078 3e7b9518<br>afbfa202 a8284bf3 6e8e4b55 b35f4275<br>93d84967 6da0d1d5 5d8360fb 5f07fea2<br>1906 |
| MD5 Hash<br>Digest of<br>B1 and B2<br>1907 | 008EE33A 9D58B51C FEB425B0 959121C9<br><br><br>1908 |
| Encryption of<br>Blockchain Data<br>Block B1<br>(Base_64)<br><br>1909 | 41bJJH1x Z+C0xxNl 83rTSEi8 CnGgU2Bg<br>6jVMA2bW VDPCcVQI vRc1es4m znQZVLsH<br>F3XgoRLv IVPpOS2C ABSXLHnf eoH6yEOx<br>Tu5WMhp8 pCqdAGOn vehb5RZV /q2Qomme<br>vWTuSNqG WlSzLB8M AhMmbHkh H8mA7nTk<br>HXypAVy/ kEw=<br>1910 |
| Encryption of<br>Blockchain Data<br>Block B2<br>(Base_64)<br><br>1911 | 41bJJH1x Z+C0xxNl 83rTSEi8 CnGgU2Bg<br>6jVMA2bW VDPCcVQI vRc1es4m znQZVLsH<br>F3XgoRLv IVPpOS2C ABSXLAzx OBR0OuOn<br>wi0/s06V XiAjRTtW Qu9z9rEt shEWpxL7<br>QoNFLJ9f /4YbL/V+ 6YrQo67+ bhkKDIza<br>4xAAtUle fhs=<br>1912 |

FIG. 19

BLOCKCHAIN ZIPPER ENCRYPTED PACKAGE

FIELD OF THE INVENTION

The present invention relates to the field of blockchain technologies and more particularly to a blockchain technology for a public key encryption blockchain that encrypts a data blockchain block by block to form a blockchain zipper encrypted package.

BACKGROUND OF THE SPECIFICATION

A blockchain is a continuously growing list of records, called blocks, which are linked and secured using cryptography. Each block typically contains a cryptographic hash of the previous block and itself, a timestamp, and transaction data. By design, a blockchain is inherently resistant to modification of the data. It is an open, distributed ledger that can record transactions between two parties efficiently and in a verifiable and secure way. For use as a distributed ledger, a blockchain is typically managed by a peer-to-peer network collectively adhering to a protocol for validating new blocks. Once recorded, the data in any given block cannot be altered retroactively without the alteration of all subsequent blocks, which requires collusion of the network majority. Blockchains are secure by design and are an example of a distributed computing system with high Byzantine fault tolerance. Decentralized consensus is therefore achieved with a blockchain. This feature makes blockchains potentially suitable for the recording of events, medical records, and other records management activities, such as identity management, transaction processing, documenting provenance, food traceability, or voting. The first work on a cryptographically secured chain of blocks was described in 1991 by Stuart Haber and W. Scott Stornetta. In 1992, Bayer, Haber, and Stornetta incorporated Merkle trees to the design, which improved its efficiency by allowing several documents to be collected into one block.

Public-key cryptography, or asymmetric cryptography, is a cryptographic system that uses pairs of keys. Each pair consists of a public key, which may be known to others, and a private key, which may not be known by anyone except the owner. The generation of such key pairs depends on cryptographic algorithms which are based on mathematical problems termed one-way functions. Effective security requires keeping the private key private; the public key can be openly distributed without compromising security. In such a system, any person can encrypt a message using the intended receiver's public key, but that encrypted message can only be decrypted with the receiver's private key. This allows, for instance, a server program to generate a cryptographic key intended for a suitable symmetric-key cryptography, then to use a client's openly-shared public key to encrypt that newly generated symmetric key. The server can then send this encrypted symmetric key over an insecure channel to the client; only the client can decrypt it using the client's private key, which pairs with the public key used by the server to encrypt the message. With the client and server both having the same symmetric key, they can safely use symmetric key encryption to communicate over otherwise-insecure channels. This scheme has the advantage of not having to manually pre-share symmetric keys while gaining the higher data throughput advantage of symmetric-key cryptography. With public-key cryptography, robust authentication is also possible. A sender can combine a message with a private key to create a short digital signature on the message. Anyone with the sender's corresponding public key can combine that message with a claimed digital signature; if the signature matches the message, the origin of the message is verified showing it must have been made by the owner of the corresponding private key.

Public key algorithms are fundamental security primitives in modern cryptosystems, including applications and protocols which offer assurance of the confidentiality, authenticity and non-reputability of electronic communications and data storage. They underpin numerous Internet standards, such as Transport Layer Security (TLS), Secure Shell Protocol (SSH), Secure/Multipurpose Internet Mail Extensions (S/MIME), and Pretty Good Privacy (PGP). Some public key algorithms provide key distribution and secrecy, such as Diffie-Hellman key exchange. Some public key algorithms provide digital signatures, such as Digital Signature Algorithm. While other public key algorithms provide both key distribution and secrecy with digital signatures, such as RSA (Rivest-Shamir-Adleman). Compared to symmetric encryption, asymmetric encryption is rather slower than good symmetric encryption, too slow for many purposes. Today's cryptosystems, such as TLS and SSH, use both symmetric encryption and asymmetric encryption, often by using asymmetric encryption to securely exchange a secret key which is then used for symmetric encryption.

A birthday attack is a type of cryptographic attack that exploits mathematical collisions that result when different messages are hashed by a hash algorithm, but produce the same hash digest, which can render computer security systems vulnerable to hacking. A malicious party uses a different file with the same hash digest as a file accepted by a computer system to pry the network open in a hacking attack. The use of different files with the same hash digest resulting from collisions to hack networks is known as a birthday attack.

SUMMARY OF THE SPECIFICATION

The present specification discloses a blockchain zipper encrypted package. The blockchain zipper encrypted package is formed of a dual blockchain structure where the two blockchains are logically interlocked in order to form a zipper encrypted package. One of the two blockchains is a data blockchain that contains data. The data contained by the data blockchain can be any form of data: financial data, medical data, business data, technical data, software data, informational data, executable data, and data in the form of: emails, spreadsheets, documents, photographs, media, images, photos, video, music, or any kind of file. The other of the two blockchains is a public key encryption blockchain that contains prime numbers used to encrypt and decrypt the data blockchain. Public key encryption requires two prime numbers. These two prime numbers are stored in different blockchain blocks that are adjacent to each other according to the present specification. The data blockchain is sequentially aligned with the public key encryption blockchain. Each data blockchain block requires encryption by a pair of public key encryption blockchain blocks in order to acquire the pair of prime numbers with one prime number coming from one blockchain block where the two prime numbers come from a pair of adjacent blockchain blocks that logically straddle the one data blockchain block. In this manner, the one data blockchain block logically interlocks or meshes with the pair of public key encryption blockchain blocks that encrypt it with the prime numbers contained therein. Sequential pairs of overlapping public key encryption blockchain blocks encrypt sequential data blockchain blocks such that the data blockchain interlocks with the public key encryption blockchain to form a zipper encrypted package. The data blockchain may be encrypted and decrypted with the public key encryption blockchain. When data blockchain blocks are sequentially encrypted by pairs of prime numbers contained in pairs of adjacent public key encryption blockchain blocks, the combination of the data blockchain and public key encryption blockchain forms a blockchain zipper encrypted package. A blockchain zipper encrypted package is logically formed by the combination of the data blockchain with the public key encryption blockchain. The blockchain zipper encrypted package may be stored as a single file with the data blockchain and the public key encryption blockchain forming a single zipped file with metadata linking the data blockchain to the public key encryption blockchain. Alternatively, the blockchain zipper encrypted package may be stored as two separate files: one file formed by the data blockchain and the other file formed by the public key encryption blockchain with the two files being linked together by metadata stored in the data blockchain and the public key encryption blockchain. The data blockchain has one blockchain block less than the public key encryption blockchain so that each and every data blockchain block may interlock and get encrypted by a sequential pair of public key blockchain blocks.

To prevent possible tampering or hacking with a blockchain zipper encrypted package, the blockchain zipper encrypted package may be unzipped to separate the data blockchain from the public key encryption blockchain into separate files. For transmission, the data blockchain is transmitted across a communications channel that is separate from the communications channel used to transmit the public key encryption blockchain. For storage on a distributed network, it is preferred that the data blockchain be stored on nodes of the distributed network that are different from the nodes that store the public key encryption blockchain.

A public key slider utility is used to logically lock the data blockchain and public key encryption blockchain together into a blockchain zipper encrypted package by taking prime numbers from a pair of adjacent public key encryption blockchain blocks to encrypt one of the data blockchain blocks. The genesis data blockchain block of the data blockchain is encrypted by a first prime number taken from the genesis public key encryption blockchain block of the public key encryption blockchain and a second prime number taken from the public key encryption blockchain block sequentially adjacent to the genesis block that includes a cryptographic hash from the genesis public key encryption blockchain block. The terminating data blockchain block is encrypted by a first prime number taken from the next to the last public key encryption blockchain block and a second prime number taken from the terminating public key encryption blockchain block that includes a cryptographic hash from the next to the last public key encryption blockchain block. The prime numbers from the genesis public key encryption blockchain block and the terminating public key encryption blockchain block are used to encrypt only one data blockchain block each. Interlinking public key encryption blockchain blocks link the genesis public key encryption blockchain block to the terminating public key encryption blockchain block logically through interlinking cryptographic hash digests. When the interlinking public key encryption blockchain blocks contain a single prime number, those prime numbers from the interlinking public key encryption blockchain blocks are used twice to encrypt adjacent data blockchain blocks in different pairs. One pair is formed with the prime number taken from the public key encryption blockchain block sequentially before the block containing a particular prime number, and a different pair is formed with the prime number taken from the public key encryption blockchain block sequentially after the particular prime number. When the interlinking public key encryption blockchain blocks contain two prime numbers, no prime number is used to encrypt more than one data blockchain block. The data blockchain has one blockchain block less than the public key encryption blockchain so that each and every data blockchain block may interlock and get encrypted by a sequential pair of public key blockchain blocks.

Blockchain zipper encrypted packages have numerous advantages for public key encryption of blockchain blocks. A public key encryption blockchain allows each data blockchain block to be separately encrypted with different pairs of prime numbers. With long and ultra-long data blockchains, sequential storage of prime numbers used to encrypt and decrypt each sequential data blockchain block in adjacent pairs of public key encryption blockchain blocks greatly simplifies the storage of public key information. In this manner, the only metadata needed to link a public key encryption blockchain to its corresponding data blockchain in the blockchain zipper encrypted package is stored within the genesis blockchain blocks of both blockchains. There is no need to have further metadata linking individual blockchain blocks in the data blockchain after the genesis data blockchain block to pairs of public key encryption blockchain blocks because the two blockchains logically interlink when they are brought together sequentially in their entirety up to the data blockchain block that requires encryption or decryption. The use of a public key encryption blockchain with a data blockchain limits the need to have metadata associating the two blockchains together just to the initial genesis blockchain block of each blockchain. All other data blockchain blocks are encrypted by pairs of public key encryption blockchain blocks without any metadata interlinking them. For every data blockchain block except for the initial genesis data blockchain block, there is no direct metadata to link which pair of public key encryption blockchain blocks decrypt which data blockchain block. Thus, any malicious third party would need the entire public key encryption blockchain order to decrypt the entire data blockchain. Further, if any malicious third party only had a portion of the public key encryption blockchain, it could only decrypt the corresponding logically interlocked portion of the data blockchain after significant trial and error.

The present specification discloses a non-volatile computer tangible medium for a blockchain zipper encrypted package for protecting blockchain data with public key encryption. The blockchain zipper encrypted package includes a data blockchain formed of a plurality of data blockchain blocks that contain data for encryption. The blockchain zipper encrypted package also includes a public key encryption blockchain formed of a plurality of public key blockchain blocks that contain prime numbers for encrypting the data blockchain blocks. The combination of the data blockchain and the public key encryption blockchain forms a blockchain zipper encrypted package where sequential pairs of adjacent public key blockchain blocks from the public key encryption blockchain encrypt individual data blockchain blocks in sequential order on the data blockchain. Each public key blockchain block provides one prime number used to encrypt a data blockchain block, thereby requiring a pair of adjacent public key blockchain blocks to provide a pair of prime numbers for public key encryption of one data blockchain block. In a preferred embodiment, each public key blockchain block contains a single prime number used for encryption of the data blockchain blocks. Three sequential public key blockchain blocks are required to separately encrypt two sequential data blockchain blocks where the three sequential public key blockchain blocks form two different adjacent pairs of public key encryption blockchain blocks. The three sequential public key encryption blockchain blocks provide two different pairs of prime numbers to separately encrypt the data blockchain blocks by reusing a prime number from a public key encryption blockchain block in the middle of the three sequential public key blockchain blocks to form two different keys. In an alternative embodiment, each public key blockchain block contains two or more prime numbers used to encrypt data blockchain blocks except for a genesis blockchain block and a terminating blockchain block that both contain a single prime number. In this alternative embodiment, each public key blockchain block provides one of two prime numbers used to encrypt one data blockchain block that is not reused for encryption of other adjacent data blockchain blocks.

In either embodiment, the public key encryption blockchain logically meshes with the data blockchain in an interleaved zipper format such that pairs of adjacent sequential public key encryption blockchain blocks straddle each sequential data blockchain block that is encrypted by them. The data blockchain is encrypted by having each of its constituent blockchain blocks individually encrypted by a different key that is formed from prime numbers stored within different pairs of adjacent public key encryption blockchain blocks. The entire data blockchain is encrypted by the public key encryption blockchain. The data blockchain has one blockchain block less than the public key encryption blockchain so that each and every data blockchain block may logically interlock with and get encrypted by a sequential pair of public key blockchain blocks. The public key encryption blockchain can decrypt the entire data blockchain when it is aligned with the data blockchain such that each pair of adjacent public key blockchain blocks can decrypt the data blockchain block straddled by that pair of adjacent public key blockchain blocks. In the preferred embodiment, each public key encryption blockchain block contains a single prime number that may be used twice to encrypt two adjacent data blockchain blocks that straddle each public key blockchain block except for a prime number contained in a genesis block and a prime number contained in a terminating block of the public key encryption blockchain which are both used only once. In the alternative embodiment, each public key blockchain block contains a pair of prime numbers except for a genesis blockchain block and a terminating blockchain block that both contain a single prime number providing that each prime number is used to encrypt one data blockchain block and is not reused to encrypt adjacent data blockchain blocks. After the data blockchain has been encrypted by the public key encryption blockchain, the blockchain zipper encrypted package is transmitted through two separate communications channels by separating the blockchain zipper encrypted package into its two constituent blockchains, with the data blockchain being transmitted in a communication channel separate from the public encryption key blockchain.

The present specification discloses a non-volatile computer tangible medium for a blockchain zipper encrypted package for protecting blockchain data with public key encryption. The blockchain zipper encrypted package includes a data blockchain formed of a plurality of data blockchain blocks that contain data for encryption. The blockchain zipper encrypted package also includes a public key encryption blockchain formed of a plurality of public key blockchain blocks that logically meshes with the data blockchain in an interleaved zipper format such that pairs of adjacent public key encryption blockchain blocks straddle each individual data blockchain block. Each public key blockchain block contains a prime number for public key encryption, wherein each data blockchain block is encrypted with a pair of prime numbers acquired from the pair of adjacent public key encryption blockchain blocks that straddle that particular data blockchain block. The combination of the data blockchain and the public key encryption blockchain forms a blockchain zipper encrypted package where the data blockchain is encrypted block by block. The data blockchain and the public key encryption blockchain are stored on separate nodes of a distributed computer network. The data blockchain has one blockchain block less than the public key encryption blockchain so that each and every data blockchain block may interlock and get encrypted by a sequential pair of public key blockchain blocks. Each public key blockchain block contains a single prime number that may be used twice to encrypt two adjacent data blockchain blocks that straddle each public key blockchain block except for a prime number contained in a genesis block and a prime number contained in a terminating block of the public key encryption blockchain that are both used only once. After the data blockchain has been encrypted by the public key encryption blockchain, the blockchain zipper encrypted package is transmitted through two separate communications channels by separating the blockchain zipper encrypted package into its two constituent blockchains, with the data blockchain being transmitted in a communication channel separate from the public encryption key blockchain.

The present specification also discloses a non-volatile computer tangible medium for a blockchain zipper encrypted package for protecting blockchain data with public key encryption. The blockchain zipper encrypted package includes a data blockchain formed of a plurality of data blockchain blocks that contain data for encryption. The blockchain zipper encrypted package also includes a public key encryption blockchain formed of a plurality of public key blockchain blocks that each contain a prime number for encrypting the data blockchain. Sequential pairs of public key encryption blockchain blocks provide pairs of prime numbers used to sequentially encrypt the data blockchain block by block. Each public key blockchain block contains a single prime number used for encryption of the data blockchain blocks, where three sequential public key blockchain blocks are required to separately encrypt two sequential data blockchain blocks. The three sequential public key blockchain blocks form two different keys with prime numbers stored in adjacent pairs of public key encryption blockchain blocks. The three sequential public key encryption blockchain blocks provide two different pairs of prime numbers to separately encrypt the data blockchain blocks by reusing a prime number from a public key encryption blockchain block in the middle of the three sequential public key blockchain blocks to form two different keys. The combination of the data blockchain and the public key encryption blockchain forms a blockchain zipper encrypted package, where the data blockchain and the public key encryption blockchain are stored on separate nodes of a distributed computer network. The data blockchain has one blockchain block less than the public key encryption blockchain so that each and every data blockchain block may logically interlock and get encrypted by a sequential pair of public key blockchain blocks. After the data blockchain has been encrypted by the public key encryption blockchain, the blockchain zipper encrypted package is transmitted through two separate communications channels by separating the blockchain zipper encrypted package into its two constituent blockchains, with the data blockchain being transmitted in a communication channel separate from the public encryption key blockchain.

The present invention also discloses a process for addressing birthday attacks caused by collisions. A birthday attack is a type of cryptographic attack that exploits mathematical collisions that result when different messages are hashed by a hash algorithm, but produce the same hash digest, which can render computer security systems vulnerable to hacking. A malicious party uses a different file with the same hash digest as a file accepted by a computer system to pry the network open in a hacking attack. The use of different files with the same hash digest resulting from collisions to hack networks is known as a birthday attack. The present invention discloses a non-volatile computer tangible medium for utilizing hash algorithms and encryption to identify collisions that occur in hash algorithms to prevent birthday attacks. The method includes accessing two blockchain blocks and generating a hash digest for each blockchain block. The method further includes separately encrypting each blockchain block. A collision is identified when the hash digests for the two blockchain blocks are the same and the separate encryptions of the two blockchain blocks are different, thereby indicating a birthday attack. The two blockchain blocks are determined to be identical when both the hash digests are the same and both of the separate encryptions are the same.

Further aspects of the invention will become apparent as the following description proceeds and the features of novelty, which characterize this invention, are pointed out with particularity in the claims annexed to and forming a part of this specification.

BRIEF DESCRIPTION OF THE DRAWINGS

The novel features that are considered characteristic of the invention are set forth with particularity in the appended claims. The invention itself; however, both as to its structure and operation together with the additional objects and advantages thereof are best understood through the following description of the preferred embodiment of the present invention when read in conjunction with the accompanying drawings, wherein:

FIG. 5 illustrates five public key encryption blockchain blocks including a genesis public key encryption blockchain block from a public key encryption blockchain along with associated data tables for each public key encryption blockchain block;

FIG. 10 illustrates a flowchart diagram depicting a process for forming a blockchain zipper encrypted package;

FIG. 11 illustrates a flowchart depicting a process for distribution and decryption of a blockchain zipper encrypted package;

FIG. 12 illustrates a table in which Sophie-Germain prime numbers are assigned, based upon the type of file;

FIG. 13 illustrates a table with columns listing exemplary Sophie-Germain prime-numbers and "safe" prime-number pairs, calculation of the encryption-modulus N, calculated Euler Totient Functions, encryption E exponents, and calculated decryption D exponents;

FIG. 16 illustrates a flowchart depicting a process for storage of a blockchain zipper encrypted package on a distributed network;

FIG. 18 illustrates a metadata wrapper for blockchain blocks;

FIG. 19 illustrates a collision between two blockchain data blocks based upon the cryptographic hash digests of those two blocks which is subsequently identified and potentially avoided by also comparing the encryptions of those same two blocks.

DETAILED DESCRIPTION OF THE SPECIFICATION

While the invention has been shown and described with reference to a particular embodiment thereof, it will be understood to those skilled in the art, that various changes in form and details may be made therein without departing from the spirit and scope of the invention.

Figure 1:
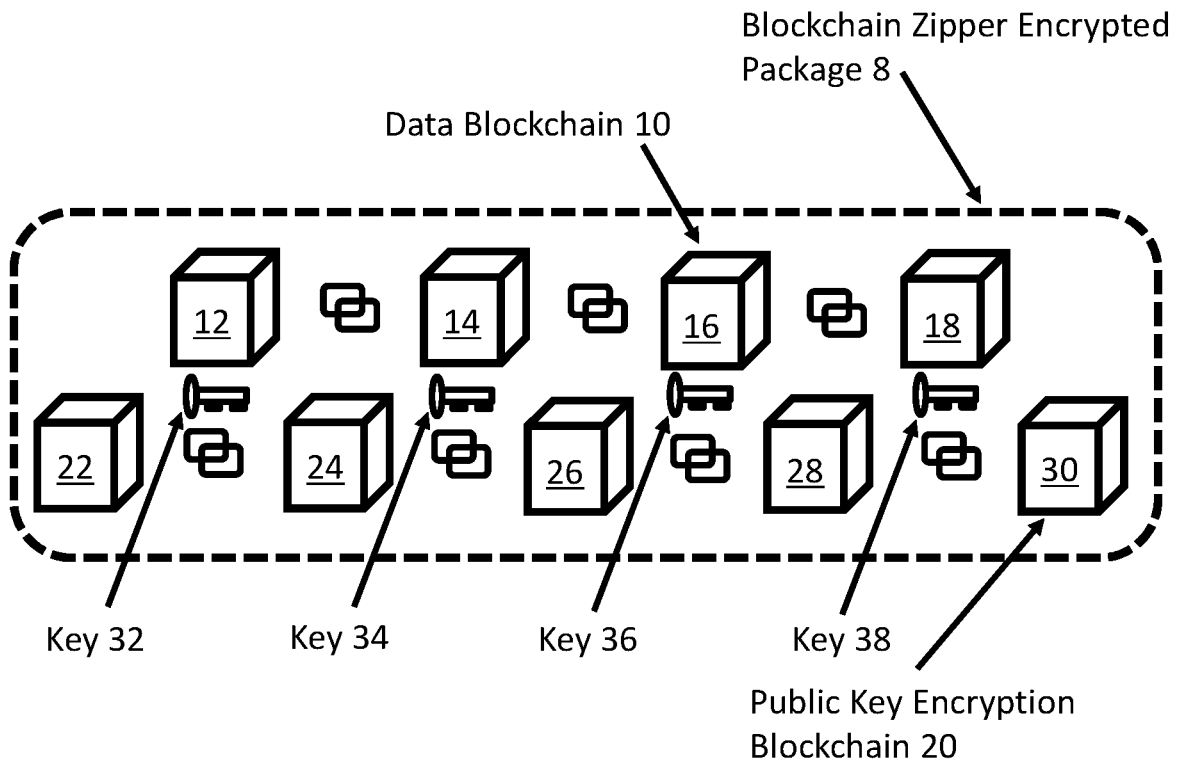
FIG. 1 illustrates a diagram of a blockchain zipper encrypted package formed of a data blockchain logically interlocked with a public key encryption blockchain.

FIG. 1 illustrates a diagram of a blockchain zipper encrypted package 8 formed of a data blockchain 10 logically interlocked with a public key encryption blockchain 20. The combination of the data blockchain 10 and the public key encryption blockchain 20 forms a blockchain zipper encrypted package 8. Data blockchain 10 may include any number of data blockchain blocks 12, 14, 16, and 18. The illustration of four data blockchain blocks 12, 14, 16, and 18 is merely exemplary. The public key encryption blockchain 20 contains one more blockchain block than the data blockchain 10 so that each data blockchain block 12, 14, 16, and 18 is straddled by two public key encryption blockchain blocks 22, 24, 26, 28, and 30. Data blockchain block 12 is straddled by public key encryption blockchain blocks 22 and 24. Data blockchain block 12 is logically interlocked with public key encryption blockchain blocks 22 and 24. Data blockchain block 12 is logically intermeshed with public key encryption blockchain blocks 22 and 24. Data blockchain block 14 is logically interlocked with public key encryption blockchain blocks 24 and 26. Data blockchain block 16 is logically interlocked with public key encryption blockchain blocks 26 and 28. Data blockchain block 18 is logically interlocked with public key encryption blockchain blocks 28 and 30. Public key encryption blockchain blocks 22 and 24 each contribute one prime number to form key 32 used to encrypt or decrypt data blockchain block 12. Public key encryption blockchain blocks 24 and 26 each contribute one prime number to form key 34 used to encrypt or decrypt data blockchain block 14. Public key encryption blockchain blocks 26 and 28 each contribute one prime number to form key 36 used to encrypt or decrypt data blockchain block 14. Public key encryption blockchain blocks 28 and 30 each contribute one prime number to form key 38 used to encrypt or decrypt data blockchain block 18. Together, data blockchain 10 logically interlocks with public key encryption blockchain 20 to form a blockchain zipper encrypted package 8. Together, data blockchain 10 logically intermeshes with public key encryption blockchain 20 to form a blockchain zipper encrypted package 8. As shown in FIG. 1, each data blockchain block 12, 14, 16, and 18 is encrypted with a pair of prime numbers of adjacent pairs of public key encryption blockchain blocks 22 and 24, 24 and 26, 26 and 28, and 28 and 30, respectively.

Figure 2:
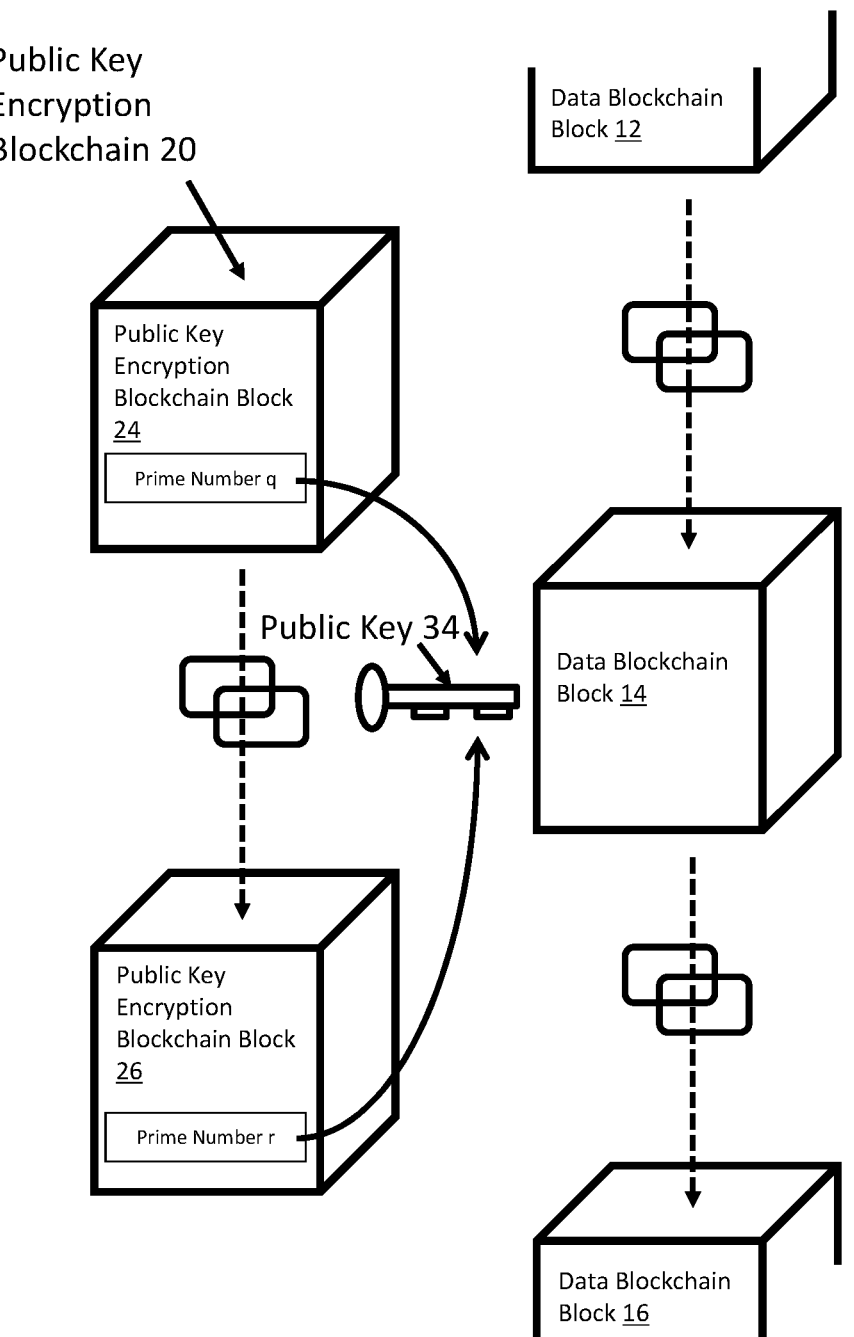
FIG. 2 illustrates the logical interlocking of a data blockchain block to a pair of public key encryption blockchain blocks.

FIG. 2 illustrates the logical interlocking of a data blockchain block 14 to a pair of public key encryption blockchain blocks 24 and 26. Data blockchain blocks 12, 14, and 16 are shown. In this example, the public key encryption blockchain blocks 24 and 26 each contain a single prime number. Public key encryption blockchain block 24 includes prime number q. Public key encryption blockchain block 26 includes prime number r. Together, prime numbers q and r form an encryption key 32 that is used to encrypt and decrypt data blockchain block 14. Prime number q from public key encryption blockchain block 24 is also used to encrypt data blockchain block 12. Prime number r from public key encryption blockchain block 26 is also used to encrypt data blockchain block 16. The combination of prime numbers q and r is used to just encrypt data blockchain block 14.

Figure 3:
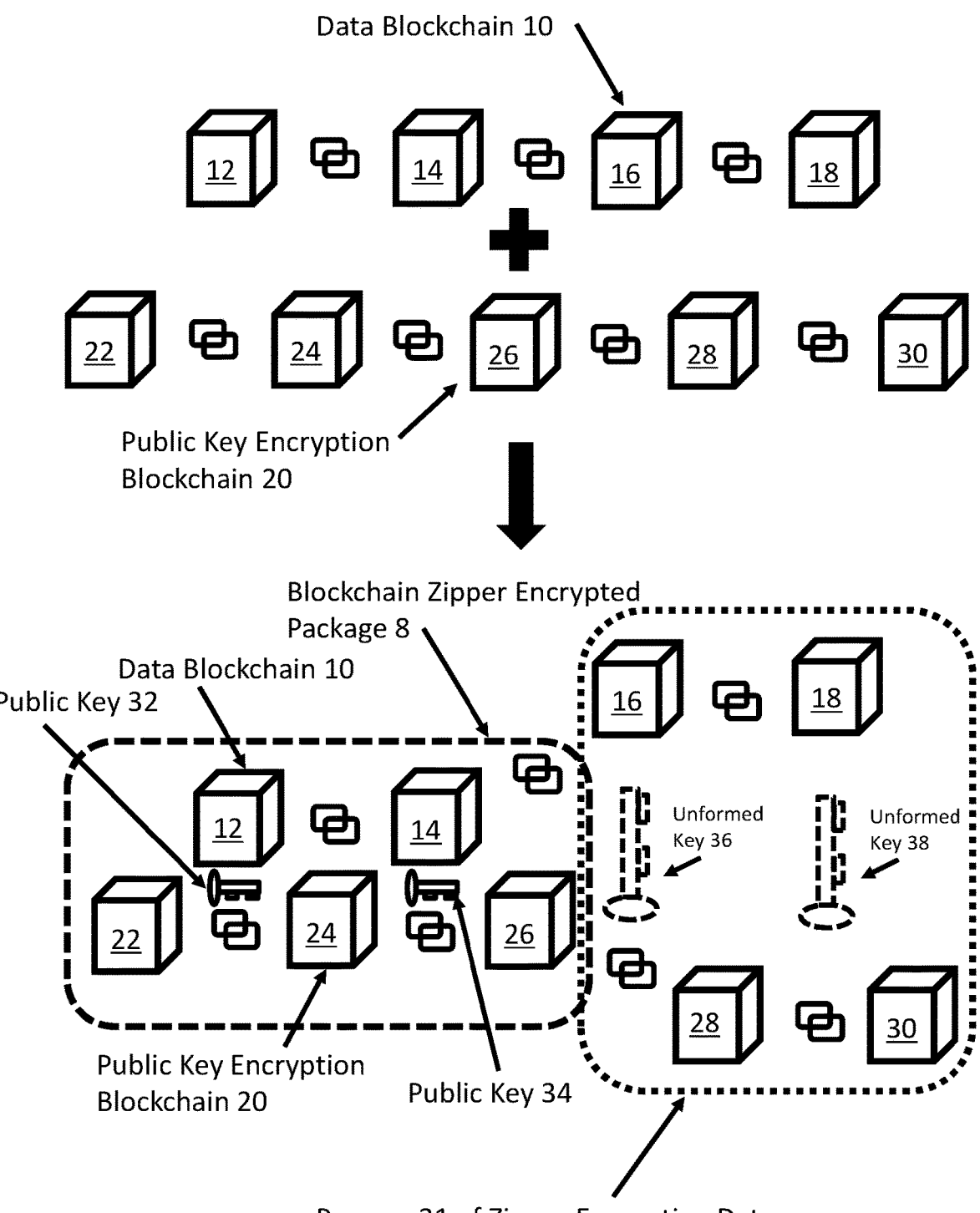
FIG. 3 illustrates a schematic process showing the zipper encryption of data blockchain blocks are encrypted with sequential pairs of public key encryption blockchain blocks to form a blockchain zipper encrypted package.
Figure 15:
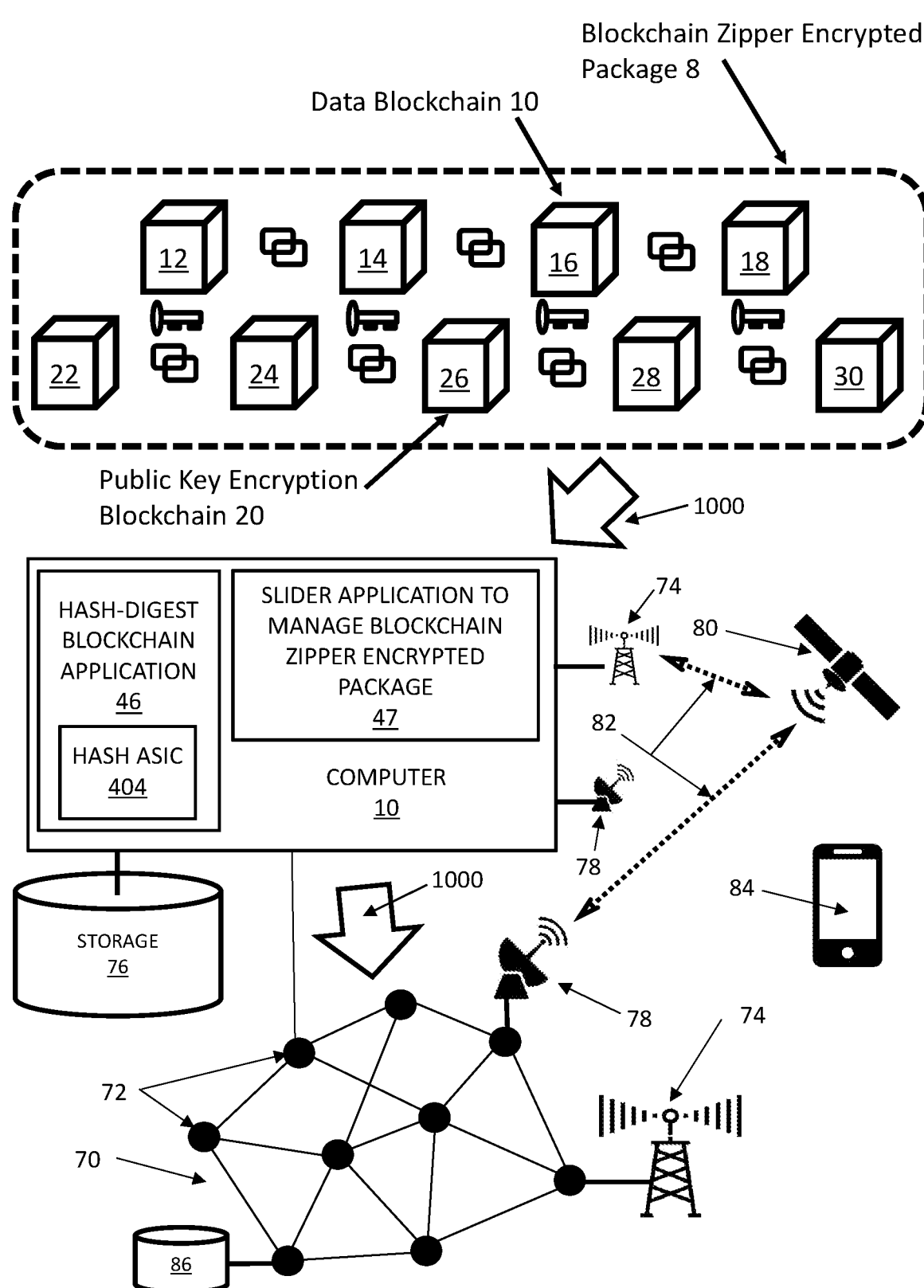
FIG. 15 schematic diagram of a distributed computer network interacting with a blockchain zipper encryption package application for distribution and storage of a blockchain zipper encrypted package.

FIG. 3 illustrates a schematic process showing the zipper encryption of data blockchain blocks 12, 14, 16, and 18 are encrypted with sequential pairs of public key encryption blockchain blocks 22 and 24, 24 and 26, 26 and 28, and 28 and 30 to form a blockchain zipper encrypted package 8. Data blockchain 10 is formed of data blockchain blocks 12, 14, 16, and 18. Public key encryption blockchain 20 is formed of public key encryption blockchain blocks 22, 24, 26, 28, and 30. In this example, public key encryption blockchain blocks 22 and 24 have been used to generate a key 32 to encrypt data blockchain block 12. Public key encryption blockchain blocks 24 and 26 have been used to generate a key 34 to encrypt data blockchain block 14. Data blockchain blocks 12 and 14 are encrypted and together with public key encryption blockchain blocks 22, 24, and 26 form a blockchain zipper encrypted package 8 shown in large-dashed line. The keys 32 and 34 are shown in solid-line because they have been formed with prime numbers from their respective public key encryption blockchain blocks 22 and 24, and 24 and 26. A process 31 of zipper encryption the remainder of data blockchain 10 with public key encryption blockchain 20 is also shown. Here, blockchain is a growing list of records that are appended to the blockchain as new blockchain blocks. As data blockchain 10 grows with the addition of new data blockchain blocks 16 and 18, those data blockchain blocks 16 and 18 will not have been initially encrypted when they are added to data blockchain 10. Here, data blockchain block 16 is shown blockchained to data blockchain block 16 through the pair of overlapping boxes symbolizing a chain, which is executed by computing an interlinking cryptographic hash digest from data blockchain block 14 that is stored in data blockchain block 16. Similarly, data blockchain block 18 is blockchained to blockchain block 16 by storing a cryptographic hash digest of data blockchain block 16 in data blockchain block 18. In order to encrypt data blockchain blocks 16 and 18, new public key encryption blockchain blocks 28 and 30 are added to public key encryption blockchain 20. In order to encrypt blockchain block 16, prime numbers from public key encryption blocks 26 and 28 are taken to form the new unformed key 36 used to encrypt data blockchain block 16. Similarly, data blockchain block 18 is encrypted with a new unformed key 38 that is formed by taking prime numbers from public key encryption blockchain blocks 28 and 30. A slider software application 47 shown in FIG. 15 is used to access and engage with data blockchain 10 and public key encryption blockchain 20 in order to access the prime numbers from public key encryption blockchain blocks 26, 28, and 30 to generate keys 36 and 38 to encrypt data blockchain blocks 16 and 18, thereby zipper encrypting blockchain blocks 16 and 18 into a blockchain zipper encrypted package 8. Given the fact that two public key encryption blockchain blocks are required to encrypt every data blockchain block, the data blockchain 10 has one less blockchain block than the public key encryption blockchain 20. As data blockchain 10 has each data blockchain block straddled by pairs of public key encryption blockchain blocks, data blockchain 10 logically interlocks or intermeshes with public key encryption blockchain 20 diagrammatically like a zipper. Zippers are zipped up into an interlocked closed manner configuration by a slider that joins the teeth of the two separate strips together. Hence, with respect to zipper encrypting the data blockchain 10, a slider application is used to access prime numbers from the public key encryption blockchain 20 to zipper encrypt each data blockchain block logically interlocking data blockchain 10 to public key encryption blockchain in a blockchain zipper encrypted package 20.

Figure 4:
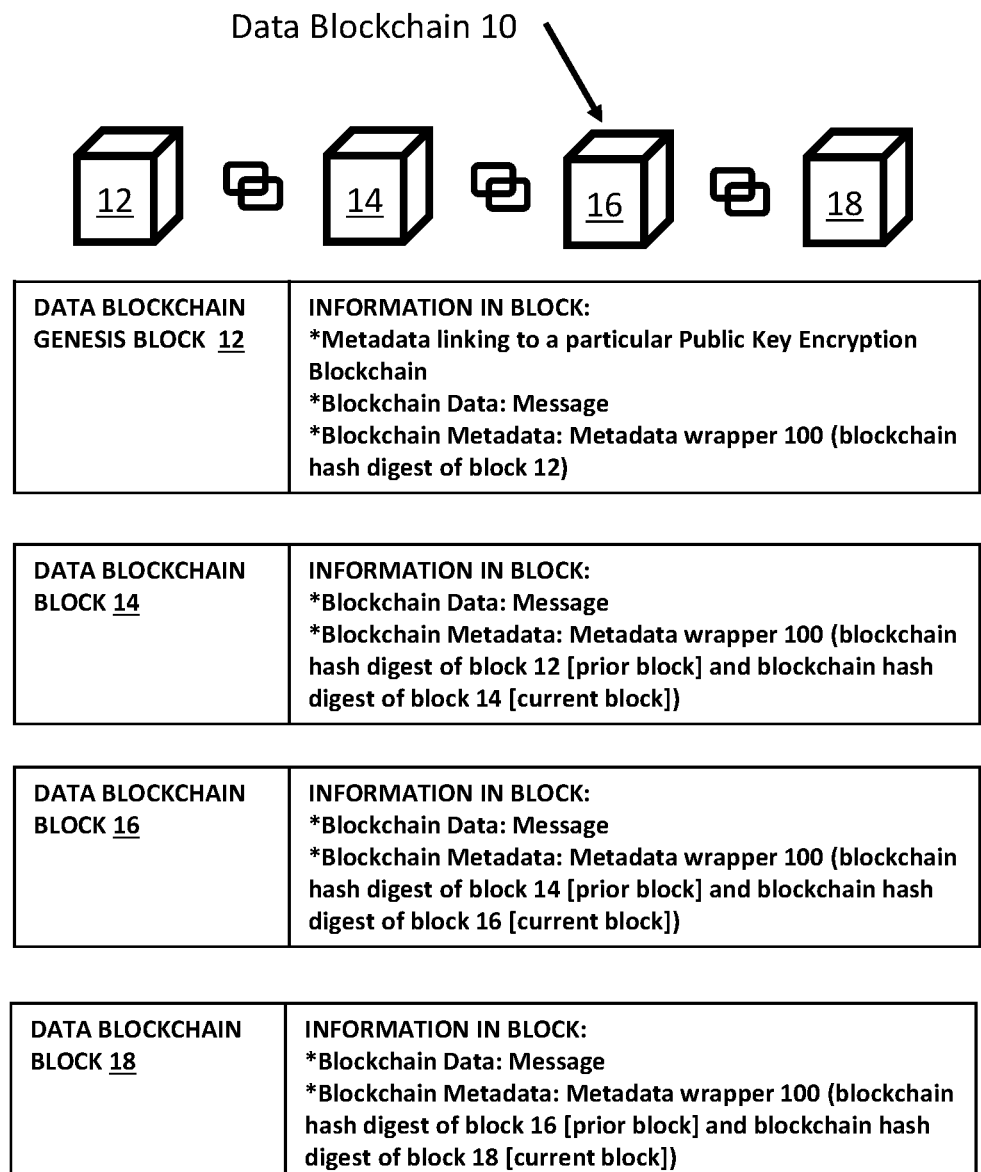
FIG. 4 illustrates four data blockchain blocks including a genesis data blockchain block from a data blockchain along with associated data tables for each data blockchain block.

FIG. 4 illustrates four data blockchain blocks 12, 14, 16, and 18 including a genesis data blockchain block 12 from a data blockchain 10 along with associated data tables for each data blockchain block. Data blockchain 10 may be formed of any number of data blockchain blocks. In this figure, data blockchain 10 is shown to have an exemplary four data blockchain blocks 12, 14, 16 and 18 for illustrative purposes. Data blockchain 10 starts with a genesis data blockchain block 12, which is the first blockchain block in data blockchain 10. Data blockchain genesis block 12 includes metadata linking the data blockchain 10 to a particular public key encryption blockchain 20. Data blockchain genesis block 12 also includes message data. Message data may be any form of data stored within data blockchain block, such as financial data, medical data, business data, technical data, software data, informational data, executable data, and data in the form of: emails, spreadsheets, documents, photographs, media, images, photos, video, music, or any kind of file. Data blockchain genesis block 12 also includes a metadata wrapper 100 shown in FIG. 18 that includes a unique identifier for the blockchain block, metadata interlinking that data blockchain 10 to a particular public key encryption blockchain 20, identification of the hash algorithm used, a listing of all interlinking hash digests, and metadata on the data contents of the blockchain block. In this case, genesis block 12 includes a hash digest of itself. Data blockchain block 14 includes message data. Message data may be any form of data stored within data blockchain block, such as financial data, medical data, business data, technical data, software data, informational data, executable data, and data in the form of: emails, spreadsheets, documents, photographs, media, images, photos, video, music, or any kind of file. Data blockchain block 14 also includes a metadata wrapper 100 shown in FIG. 18 that includes a unique identifier for the blockchain block, identification of the hash algorithm used, a listing of all interlinking hash digests, and metadata on the data contents of the blockchain block. In this case, data blockchain block 14 includes a hash digest of genesis block 12 and a hash digest of itself. Data blockchain block 16 includes message data. Message data may be any form of data stored within data blockchain block, such as financial data, medical data, business data, technical data, software data, informational data, executable data, and data in the form of: emails, spreadsheets, documents, photographs, media, images, photos, video, music, or any kind of file. Data blockchain block 16 also includes a metadata wrapper 100 shown in FIG. 18 that includes a unique identifier for the blockchain block, identification of the hash algorithm used, a listing of all interlinking hash digests, and metadata on the data contents of the blockchain block. In this case, data blockchain block 16 includes a hash digest of block 14 and a hash digest of itself. Data blockchain block 16 includes message data. Message data may be any form of data stored within data blockchain block, such as financial data, medical data, business data, technical data, software data, informational data, executable data, and data in the form of: emails, spreadsheets, documents, photographs, media, images, photos, video, music, or any kind of file. Data blockchain block 16 also includes a metadata wrapper 100 shown in FIG. 18 that includes a unique identifier for the blockchain block, identification of the hash algorithm used, a listing of all interlinking hash digests, and metadata on the data contents of the blockchain block. In this case, data blockchain block 16 includes a hash digest of block 14 and a hash digest of itself. Data blockchain block 18 includes message data. Message data may be any form of data stored within data blockchain block, such as financial data, medical data, business data, technical data, software data, informational data, executable data, and data in the form of: emails, spreadsheets, documents, photographs, media, images, photos, video, music, or any kind of file. Data blockchain block 18 also includes a metadata wrapper 100 shown in FIG. 18 that includes a unique identifier for the blockchain block, identification of the hash algorithm used, a listing of all interlinking hash digests, and metadata on the data contents of the blockchain block. In this case, data blockchain block 18 includes a hash digest of block 16 and a hash digest of itself. Note that only genesis block 12 contains metadata linking any portion of data blockchain 10 to a particular public key encryption blockchain 20. The remaining data blockchain blocks 14, 16 and 18 do not contain any metadata linking those blockchain blocks to any particular public key encryption blockchain. This lack of interlinking metadata for these other data blockchain blocks 14, 16, and 18 means that it is difficult for a hacker to determine which public key encryption blockchain block decrypts the acquired data blockchain block as there is no interlinking metadata. The only way to match a particular pair of public key encryption blockchain blocks needed to decrypt a particular data blockchain block is by having the entire data blockchain 10 and the entire public key encryption blockchain and interlocking them logically in sequential order beginning with the genesis blocks. Once interlocked, the pairs of public key encryption blockchain blocks appear in order to successfully decrypt their logically corresponding data blockchain blocks.

FIG. 5 illustrates five public key encryption blockchain blocks 22, 24, 26, 28, and 30 including a genesis public key encryption blockchain block 22 from a public key encryption blockchain 20 along with associated data tables for each public key encryption blockchain block. Public key encryption blockchain 20 may include any number of blockchain blocks, but is required to include one more blockchain block than data blockchain 10 so that sequential pairs of public key encryption blockchain blocks may encrypt each and every data blockchain block. Public key encryption blockchain 20 may include more than one blockchain block than data blockchain 10. Public key encryption blockchain genesis block 22 includes metadata linking the public key encryption blockchain 20 to a particular data blockchain 10. Public key encryption blockchain block 22 contains a prime number p as data. Public key encryption blockchain genesis block 22 also includes a metadata wrapper 100 shown in FIG. 20 that includes a unique identifier for the blockchain block, identification of the hash algorithm used, a listing of all interlinking hash digests, and metadata on the data contents of the blockchain block. In this case, genesis block 22 includes a hash digest of itself. For the genesis blockchain block 22, the metadata wrapper 100 includes metadata linking the public key encryption blockchain 20 to a particular data blockchain 10. Public key encryption blockchain block 24 includes a prime number q as data. Public key encryption blockchain block 24 also includes a metadata wrapper 100 shown in FIG. 20 that includes a unique identifier for the blockchain block, identification of the hash algorithm used, a listing of all interlinking hash digests, and metadata on the data contents of the blockchain block. In this case, block 24 includes a hash digest of genesis block 22 and a hash digest of itself. Public key encryption blockchain block 26 includes a prime number r as data. Public key encryption blockchain block 26 also includes a metadata wrapper 100 shown in FIG. 20 that includes a unique identifier for the blockchain block, identification of the hash algorithm used, a listing of all interlinking hash digests, and metadata on the data contents of the blockchain block. In this case, block 26 includes a hash digest of block 24 and a hash digest of itself. Public key encryption blockchain block 28 includes a prime number s as data. Public key encryption blockchain block 28 also includes a metadata wrapper 100 shown in FIG. 20 that includes a unique identifier for the blockchain block, identification of the hash algorithm used, a listing of all interlinking hash digests, and metadata on the data contents of the blockchain block. In this case, block 28 includes a hash digest of block 26 and a hash digest of itself. Public key encryption blockchain block 30 includes a prime number t as data. Public key encryption blockchain block 30 also includes a metadata wrapper 100 shown in FIG. 20 that includes a unique identifier for the blockchain block, identification of the hash algorithm used, a listing of all interlinking hash digests, and metadata on the data contents of the blockchain block. In this case, block 30 includes a hash digest of block 28 and a hash digest of itself. Note that block 30 is the terminating blockchain block of public key encryption blockchain 20.

Figure 6:
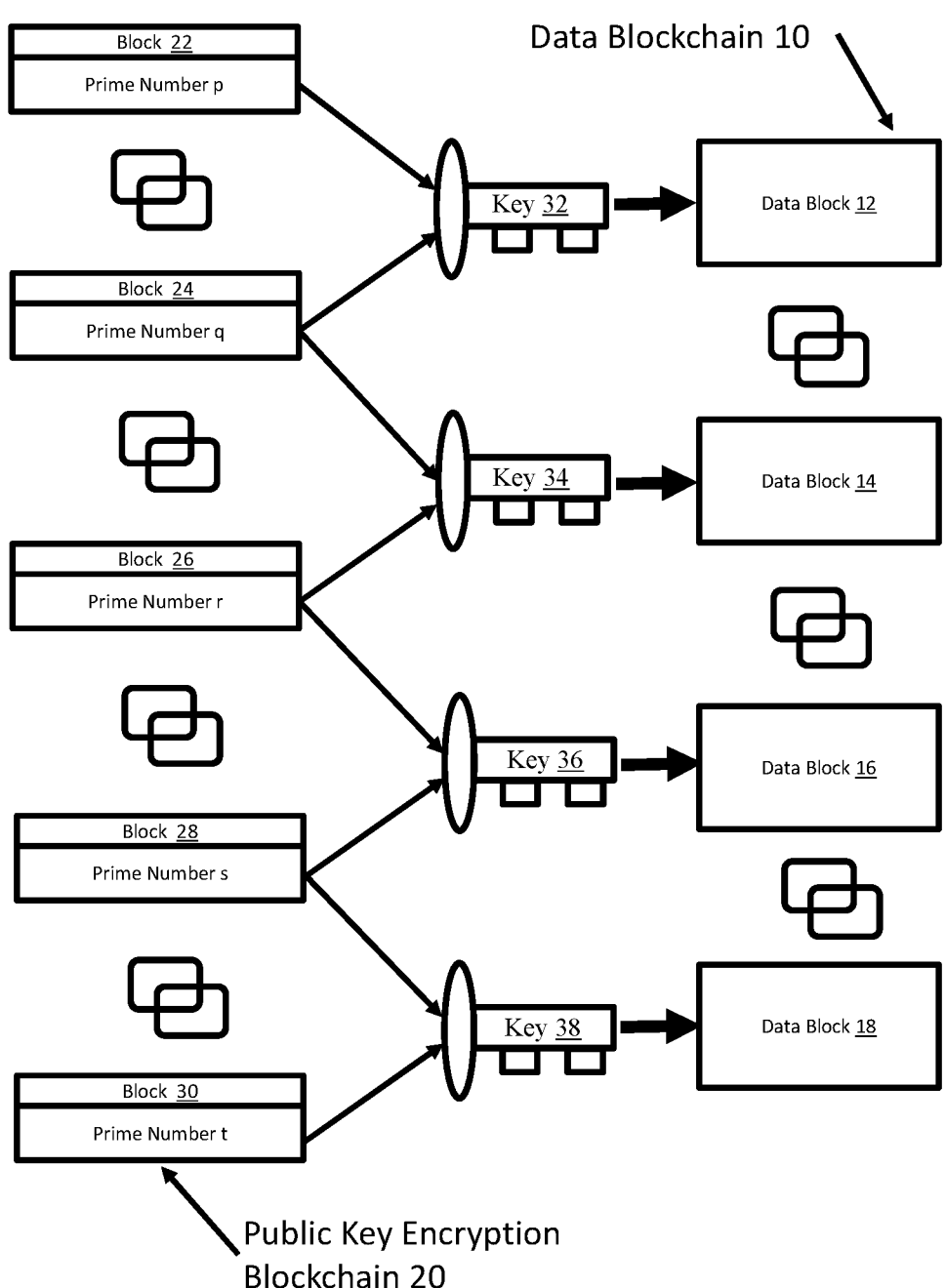
FIG. 6 illustrates a preferred embodiment in which each blockchain block of a public key encryption blockchain includes a single prime number used to encrypt data blockchain blocks.

FIG. 6 illustrates a preferred embodiment in which each blockchain block 22, 24, 26, 28, and 30 of a public key encryption blockchain 20 includes a single prime number used to encrypt data blockchain blocks 12, 14, 16, and 18 of a data blockchain 10. As can be seen in this figure, public key encryption blockchain blocks 22, 24, 26, 28, and 30 are blockchained together to form a public key encryption block 20. However, public key encryption blockchain blocks 22, 24, 26, 28, and 30 are not blockchained to any of the blockchain blocks 12, 14, 16, and 18 forming data block-chain 10. Data blockchain 10 is not blockchained in any manner to public key encryption blockchain 20. Prime number p and prime number q from public key encryption blockchain blocks 22 and 24 are used to form key 32 that encrypts data blockchain block 12. As can be seen diagram-matically, blocks 22 and 24 form a pair of public key encryption blockchain blocks needed to form key 32 for encryption of data block 12. Blocks 22 and 24 from the public key encryption blockchain 20 straddle data block-chain block 12. Data blockchain block 12 logically inter-locks or intermeshes with public key encryption blockchain blocks 22 and 24 through encryption by key 32. Similarly, public key encryption blockchain blocks 24 and 26 provide prime numbers q and r to form key 34 used to encrypt data blockchain block 14. Note that public key encryption block-chain blocks 24 and 26 form a pair used to create key 34. In this manner, prime number q is used twice to form two different keys, 32 and 34. However, the prime number p from genesis block 22 is used only once to form key 32. Public key encryption blockchain blocks 26 and 28 provide prime numbers r and s used to form key 36 for encryption of data blockchain block 16. Note that the prime number r is used twice to form key 34 and key 36 in different pairings with prime numbers from blockchain blocks 24 and 28. Public key encryption blockchain blocks 28 and 30 provide prime numbers s and t used to form key 38 for encryption of data blockchain block 16. Note that the prime number s is used twice to form key 36 and key 38 in different pairings with prime numbers from blockchain blocks 26 and 30. Prime number t is used only once as blockchain block 30 is the terminating blockchain block of public key encryption blockchain 20.

Figure 7:
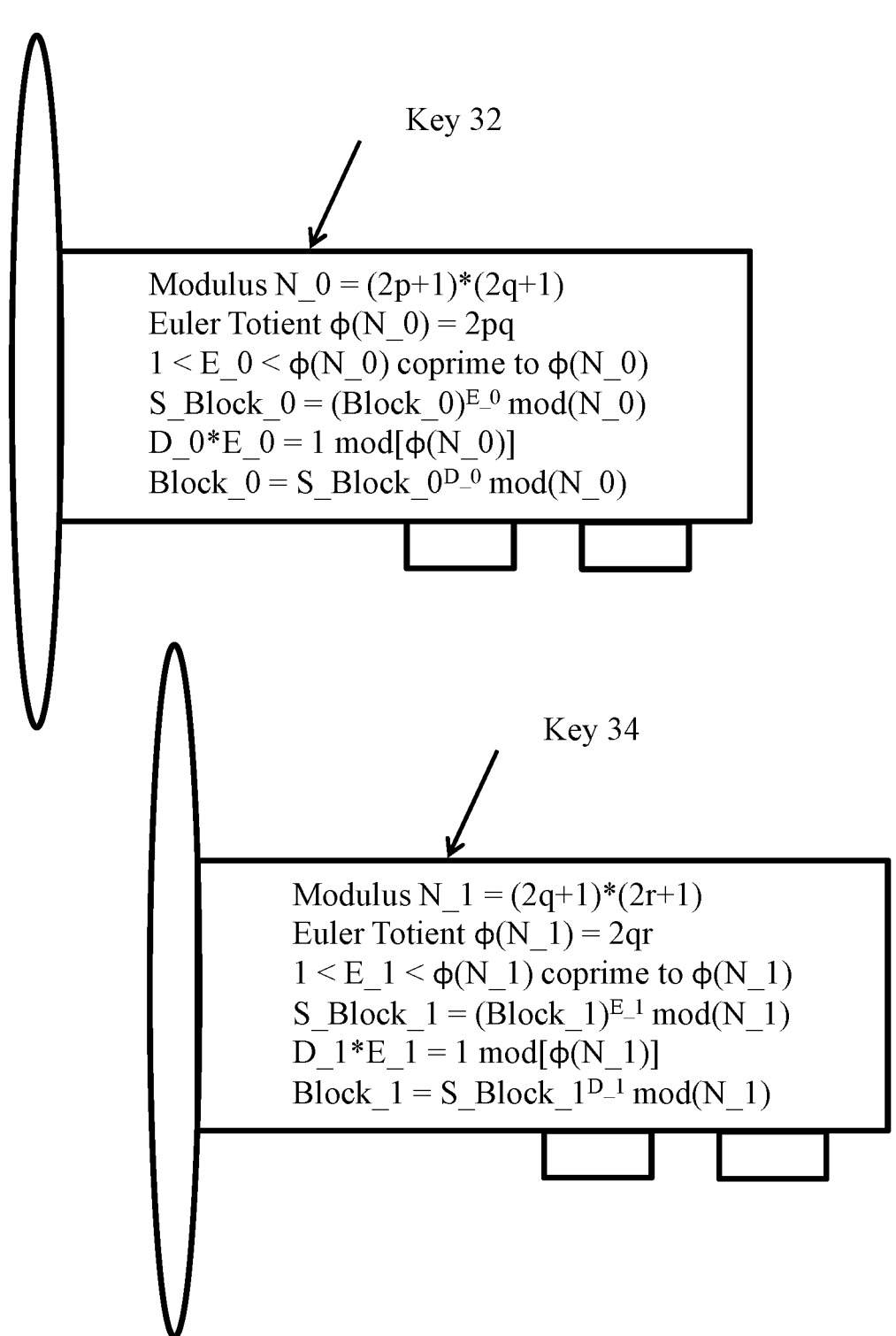
FIG. 7 illustrates first and second encryption-modulus blockchain keys formed from three public key encryption blockchain blocks.

FIG. 7 illustrates first and second encryption-modulus blockchain keys 32 and 34 formed from three public key encryption blockchain blocks 22, 24, and 26 to encrypt data blockchain blocks 12 and 14. Key 32 has encryption-modulus $N\_0=(2p+1)*(2q+1)$, using the two Sophie-Ger-main prime numbers p and q from public key encryption blockchain blocks 22 and 24. The Euler Totient function $\phi(N)$ counts the positive integers up to integer "N" that are relatively prime to integer "N." If integer "N" is the product of two Sophie-Germain prime-numbers, such as $N\_0=(2p+1)*(2q+1)$, the Euler Totient function $\phi(N)$ simplifies to the least common multiple (LCM) of (first prime-number −1) and (second prime-number −1). Since the first prime-num-ber is the Sophie-Germain "safe" prime-number 2p+1 and the second prime-number is the Sophie-Germain "safe" prime-number 2q+1, this gives $\phi(N\_0)=LCM([2p+1]-1, [2q+1]-1)=LCM(2p,2q)=2pq$. Thus, the Euler Totient func-tion involves the first prime-numbers of the Sophie-Germain prime-number pairs, when the encryption-modulus $N\_0$ is the product of the corresponding Sophie-Germain "safe" prime-numbers, which greatly simplifies the calculation of the Euler Totient function for illustrative purposes. The encryption exponent $E\_0$ is user-chosen to be a prime-number between 1 and the Euler Totient Function $\phi(N\_0)$, $1<E\_0<\phi(N\_0)$, and one which is co-prime with $\phi(N\_0)$.

Co-prime means that $\phi(N\_0)$ is not an integer multiple of encryption-exponent $E\_0$. The encrypted block is denoted by S_Block_0 and the encrypted content is equal to Block_0 100 raised to the power of the Encryption Exponent $E\_0$, and then $mod(N\_0)$ is applied, or $(Block\_0)^{E\_0} mod(N\_0)$. The mod function is for modulo arithmetic, and A mod(B) is the remainder achieved by the division of A by B, e.g. 7=2 mod(5) as 2 is the remainder when 7 is divided by 5. In the Python programming language, S_Block_0 is given by the power function pow(Block_0,E_0,N_0). The decryption exponent $D\_0$ is calculated by $D\_0*E\_0=1 mod[\phi(N\_0)]$, which is a form of an identity equation, meaning that the decryption exponent "D" acts as the inverse of the encryp-tion exponent "E" to decrypt the encrypted block. Encryp-tion exponent $D\_0$ is the solution of the Diophantine equa-tion $E\_0*D\_0-\phi(N\_0)*Y=1$. In this Diophantine equation, $D\_0$ must be a positive integer and Y (a dummy variable) must be a non-negative integer. Although there are multiple solutions for dummy variable Y, picking Y as the smallest positive integer is desired, as larger values of Y are accept-able but result in more decryption calculations without changing the outcome of the decryption process. Once $D\_0$ is solved for, decrypted Block_0 is given by $S\_Block\_0^{D\_0} mod(N\_0)$, which means the encrypted block S_Block_0 is raised to the power of the decryption exponent and then $mod(N\_0)$ is applied. In the Python programming language, decrypted Block_0 is given by the power function pow (S_Block_0,D_0,N_0). Also in FIG. 7, Key 34 has encryp-tion-modulus $N\_1=(2q+1)*(2r+1)$, using the Sophie-Ger-main prime-numbers q and r from public key encryption blockchain blocks 24 and 26. The Euler Totient function $\phi(N\_1)=LCM(2q,2r)$, which is 2qr. The encrypted block is denoted by S_Block 1, and the encrypted content is equal to $(Block\_1)^{E\_1} mod(N\_1)$. The decryption exponent $D\_1$ is calculated by $D\_1*E\_1=1 mod[ON\_1)]$, and is solution of the Diophantine equation $E\_1*D\_1-\phi(N\_1)*Y=1$. In this Diophantine equation, $D\_1$ must be a positive integer and Y (a dummy variable) must be a non-negative integer. Once $D\_1$ is solved for, decrypted Block_1 is given by $S\_Block\_1^{D\_1} mod(N\_1)$.

Figure 8:
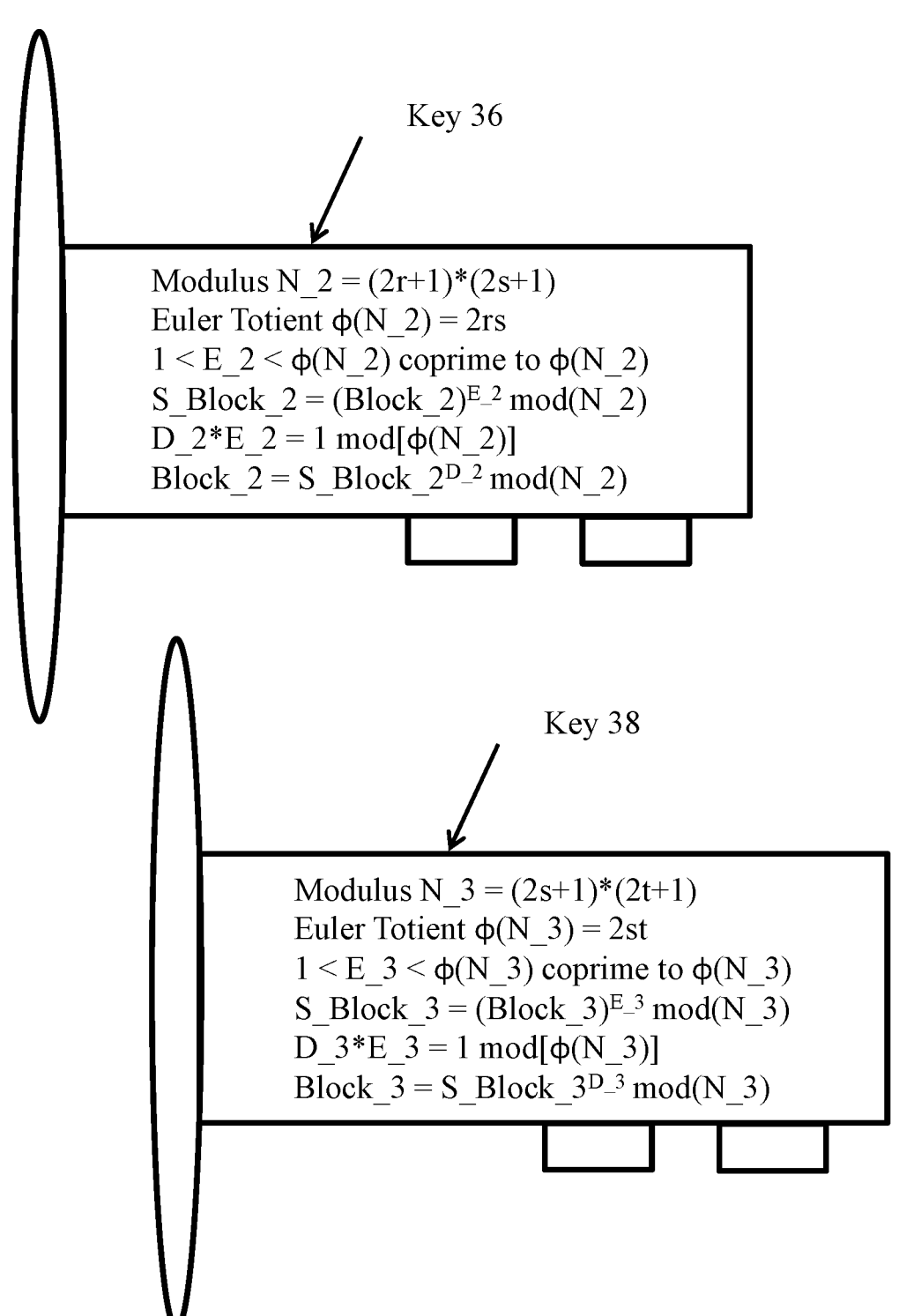
FIG. 8 illustrates third and fourth encryption-modulus blockchain keys formed from three public key encryption blockchain blocks.

FIG. 8 illustrates third and fourth encryption-modulus blockchain keys 36 and 38 formed from three public key encryption blockchain blocks 26, 28, and 30 to encrypt data blockchain blocks 16 and 18. Key 36 has encryption-modulus $N\_2=(2r+1)*(2s+1)$, using the Sophie-Germain prime-numbers r and s from public key encryption block-chain blocks 26 and 28. The Euler Totient function $\phi(N\_2)=LCM(2r,2s)$, which is 2rs. The encrypted block is denoted by S_Block_2 and the encrypted content is $(Block\_2)^{E\_2} mod(N\_2)$. The decryption exponent $D\_2$ is calculated by $D\_2*E\_2=1 mod[\phi(N\_2)]$, and is solution of the Diophan-tine equation $E\_2*D\_2-\phi(N\_2)*Y=1$. In this Diophantine equation, $D\_2$ must be a positive integer and Y (a dummy variable) must be a non-negative integer. Once $D\_2$ is solved for, decrypted Block_2 is given by $S\_Block\_2^{D\_2} mod (N\_2)$. Key 38 has encryption-modulus $N\_3=(2s+1)*(2t+1)$, using the Sophie-Germain prime-numbers s and t from public key encryption blockchain blocks 28 and 30. The Euler Totient function $\phi(N\_3)=LCM(2s,2t)$, which is 2st. The encrypted block is denoted by S_Block_3 and the encrypted content is $(Block\_3)^{E\_3} mod(N\_3)$. The decryp-tion exponent $D\_3$ is calculated by $D\_3*E\_3=1 mod[\phi(N\_3)]$, and is solution of the Diophantine equation $E\_3*D\_3-\phi(N\_3)*Y=1$. In this Diophantine equation, $D\_3$ must be a positive integer and Y (a dummy variable) must be a non-negative integer. Once $D\_3$ is solved for, decrypted Block 3 is given by $S\_Block\_3^{D\_3} mod(N\_3)$. In FIGS. 7 and 8, prime numbers p, q, r, s, and t need not be Sophie-Germain prime numbers; however, that would result in a much harder to calculate Euler Totient function.

Figure 9:
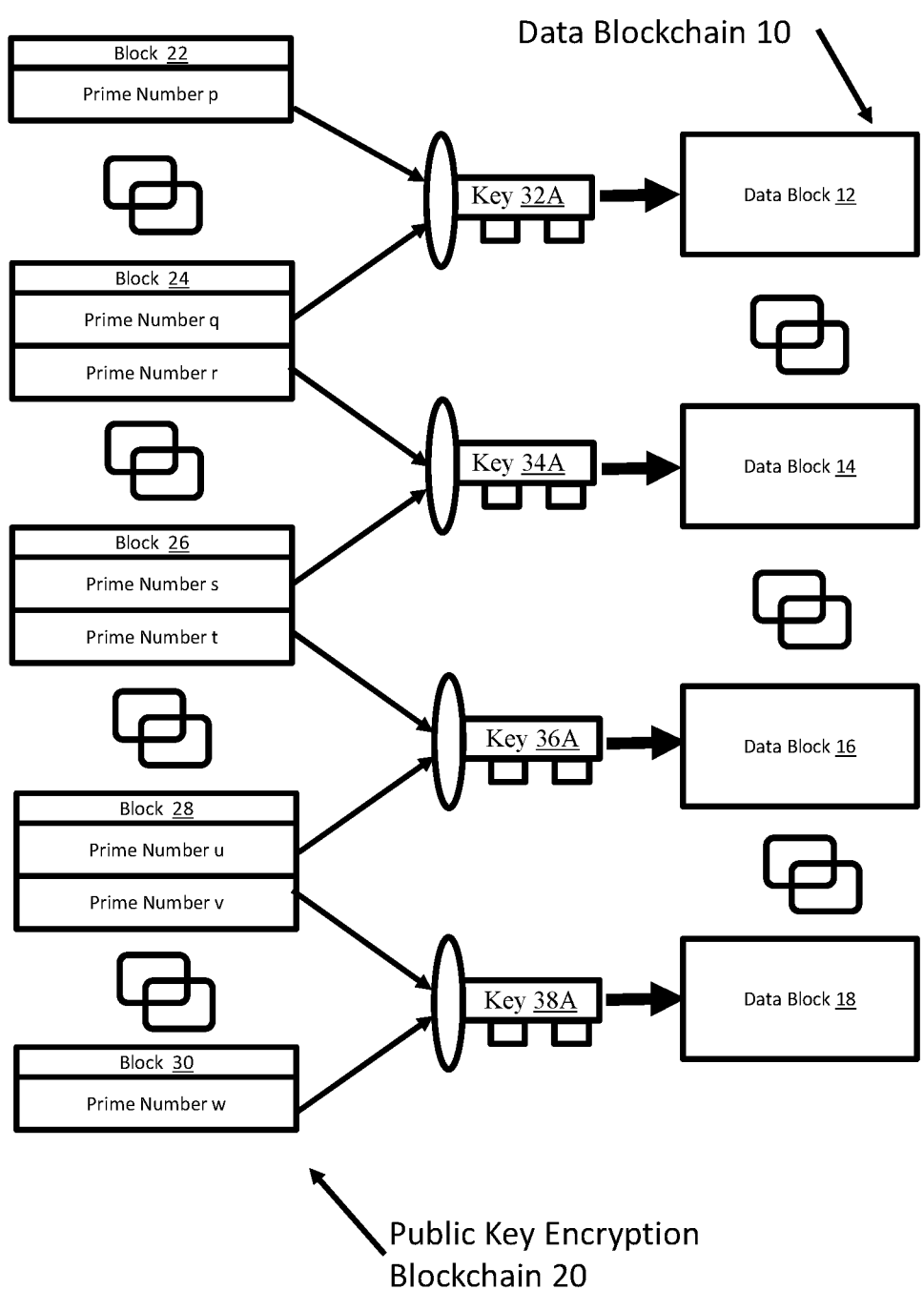
FIG. 9 illustrates an alternative embodiment in which each blockchain block of a public key encryption blockchain includes a pair of prime numbers, one of which is used from adjacent blocks to encrypt different data blockchain blocks.

FIG. 9 illustrates an alternative embodiment in which each blockchain block 22, 24, 26, 28, and 30 of a public key encryption blockchain 20 includes a pair of prime numbers, each of which is used to encrypt different data blockchain blocks 12, 14, 16, and 18 of data blockchain 10. In this alternative embodiment, public key encryption blockchain blocks 24, 26 and 28 each contain a pair of prime numbers. Blockchain block 24 includes prime numbers q and r. Blockchain block 26 contains prime numbers s and t. Blockchain block 28 includes prime numbers u and v. Genesis blockchain block 22 contains a single prime number p. Terminating blockchain block 30 includes a single prime number w. In this manner, a pair of prime numbers from two different public key encryption blockchain blocks is required to create a key. However, in this alternative embodiment, no prime number pair from adjacent public key encryption blockchain blocks is reused to make adjacent keys. While a particular prime number may appear in adjacent public key encryption blockchain blocks, each prime number from one particular public key encryption blockchain block is not reused to form multiple keys. Here public key encryption blockchain blocks 22 and 24 contribute prime numbers p and q respectively to form key 32A used to encrypt data blockchain block 12. Public key encryption blockchain blocks 24 and 26 contribute prime numbers r and s respectively to form key 34A used to encrypt data blockchain block 14. Public key encryption blockchain blocks 26 and 28 contribute prime numbers t and u respectively to form key 36A used to encrypt data blockchain block 16. Public key encryption blockchain blocks 28 and 30 contribute prime numbers v and w respectively to form key 38A used to encrypt data blockchain block 18. Note that genesis public key encryption blockchain block 22 includes a single prime number p. Note that terminating public key encryption blockchain block 30 includes a single prime number w. With blockchain blocks 24, 26, and 28 each containing a pair of prime numbers, it is possible to encrypt each data blockchain block with prime numbers from two different adjacent public key encryption blockchain block pairs without reusing a prime number pair from any adjacent public key encryption blockchain blocks.

FIG. 10 illustrates a flowchart diagram depicting a process 1000 for forming a blockchain zipper encrypted package 8. Process 1000 is performed by the slider software application 47 shown in FIG. 15. The process 1000 begins with START to initiate encryption and packaging of a blockchain zipper encrypted package in step 1002. In step 1004, slider application 47 accesses data blockchain 10 containing message data. The data blockchain is stored on nodes of a distributed network. Message data may be any form of data stored within data blockchain block, such as financial data, medical data, business data, technical data, software data, informational data, executable data, and data in the form of: emails, spreadsheets, documents, photographs, media, images, photos, video, music, or any kind of file. Slider application 47 also accesses a public key encryption blockchain 20 stored on nodes of a distributed network. Public key encryption blockchain 20 may be stored on the same nodes of a distributed network as data blockchain 10. However, it is preferred if the public key encryption blockchain 20 is stored on a separate node of a distributed network than the node that stores its corresponding data blockchain 10 for security in case either node gets hacked. In this manner, hacking a single node of a network does not provide the hacker with both the public key encryption blockchain 20 and its corresponding data blockchain 10. In step 1006, slide application 47 aligns the public key encryption blockchain 20 with the data blockchain 10 in an interlocking manner based upon the genesis blockchain blocks 22 and 12 of each blockchain respectively where the genesis blockchain block 22 of the public key encryption blockchain is the lead blockchain block of the zipper pair formed by the public key encryption blockchain 20 and the data blockchain 10. In this logically interlocking alignment, pairs of public key encryption blockchain blocks straddle each data blockchain block. In step 1008, slider application 47 accesses pairs prime numbers from pairs the public key encryption blockchain blocks straddling a selected data blockchain block, designated by the integer J. In step 1010, slider application 47 uses the accessed prime number to calculate the modulus N_J, which is then used to calculate Euler's totient function $\varphi(N\_J)$. Slider application 47 accesses an encryption exponent E as a prime from a database such at $1<E<\varphi(N\_J)$. Then in step 1012, slider application 47 encrypts data blockchain block J. The encrypted signature of Block_J is S_Block_J= (Block_J)E_J mod(N_J), where """ indicates exponentiation. The process ENDS in step 104.

FIG. 11 illustrates a flowchart depicting a process 2000 for distribution and decryption of a blockchain zipper encrypted package 8. Process 2000 is performed by slider software application 47. Process 2000 begins with START 2002 for the distribution and decryption of a blockchain zipper encrypted package 8. In step 2004, slider application 47 accesses a blockchain zipper encrypted package 8. In step 2006, slider application 47 unzips the blockchain zipper encrypted package 8 to separate the encrypted data blockchain 10 from the public key encryption blockchain 20. In step 2008, slider application 47 transmits the encrypted data blockchain 10 to a recipient on a communications channel that is separate from a communications channel used to transmit the public key encryption blockchain to the same recipient. In step 2010, slider application 47 accesses the encrypted data blockchain 10 and the public key encryption blockchain 20. Slider application 47 aligns the encrypted data blockchain 10 with the encryption keychain blockchain based upon their respective genesis blockchain blocks 12 and 22 in order to decrypt the encrypted data blockchain 10. In step 2012, slider application accesses decryption exponent D_J calculated via D_J*E_J=1 mod[$\varphi$(N_J)]. Decryption of Block_J is then given by: Block_J=S_Block_JD_J mod(N_J), where """ indicates exponentiation. The process ENDS in step 2014.

FIG. 12 illustrates a table 130 in which Sophie-Germain prime numbers are assigned based upon the type of file. *.DOC files 132 use Sophie-Germain prime-number pairs a and 2a+1, b and 2b+1, c and 2c+1, d and 2d+1, and e and 2e+1. *.MPG video files 133 use Sophie-Germain prime-number pairs f and 2f+1, g and 2g+1, h and 2h+1, i and 2i+1, and j and 2j+1. *.JPG image files 134 use Sophie-Germain prime-number pairs k and 2k+1, 1 and 21+1, m and 2m+1, n and 2n+1, and o and 2o+1. *.XLS Excel spreadsheet files 135 use Sophie-Germain prime-number pairs p and 2p+1, q and 2q+1, r and 2r+1, s and 2s+1, and t and 2t+1. Finally, *.PDF files 136 use Sophie-Germain prime-number pairs u and 2u+1, v and 2v+1, w and 2w+1, x and 2x+1, and y and 2y+1. The goal in FIG. 12 is that like documents can be encrypted by class into what could be called a compatibility-encryption of documents. FIG. 12 is only an example of such compatibility-encryption and fewer or more pairs of Sophie-Germain prime-numbers could be assigned to each file type. Additional file types could include *.ppt POWERPOINT®, data files, audio streams such as a *.wav or *.mp3 audio stream, source code such as written in C++ or PYTHON or PERL or JAVA, source code compiled as binary executable files such as *.exe or *.bin executable files, X.509 public key certificates, the contents of databases, metadata, licensing files, smart contracts, DNA genome sequences, RNA genome sequences, Electrocardiograms (ECG or EKG), Electromyograms (EMG), medical records especially pertaining to HIPAA (Health Insurance Portability and Accountability Act), dental records to include X-Ray images, purchasing records, maintenance records, payment records, bitcoins, and the like.

FIG. 13 illustrates a table 140 with columns listing exemplary Sophie-Germain prime-numbers and "safe" prime-number pairs 141, calculation of the encryption-modulus N 142, calculated Euler Totient Functions 143, encryption E exponents 144, and calculated decryption D exponents 145. The five prime-number pairs in column 141 are exemplary ones for public key encryption blockchain 20. In column 141, the first selected Sophie-Germain prime-number shown is $p=2039$ and the corresponding "safe" prime-number is $2p+1=3947$. The second selected Sophie-Germain prime-number shown is $q=2003$ and the corresponding "safe" prime-number is $2q+1=4007$. The third selected Sophie-Germain prime-number shown is $r=2039$ and the corresponding "safe" prime-number is $2r+1=4079$. The fourth selected Sophie-Germain prime-number shown is $s=2063$ and the corresponding "safe" prime-number is $2s+1=4127$. The fifth selected Sophie-Germain prime-number shown is $t=2069$ and the corresponding "safe" prime-number is $2t+1=4139$. Finally, the selected Sophie-Germain prime-number is actually the first selected Sophie-Germain prime-number $p=1973$ and the corresponding "safe" prime-number is $2p+1=3947$. In column 142, the calculation of the encryption-modulus is done, based on the Sophie-Germane prime-numbers in column 141. Encryption-modulus $N\_0=(2p+1)*(2q+1)$, which gives $N\_0=3947*4007=15815629$. Encryption-modulus $N\_1=(2q+1)*(2r+1)$, which gives $N\_1=4007*4079=16344553$. Encryption-modulus $N\_2=(2r+1)*(2s+1)$, which gives $N\_2=4079*4127=16834033$. Encryption-modulus $N\_3=(2s+1)*(2t+1)$, which gives $N\_3=4127*4139=17081653$. Finally, encryption-modulus $N\_4=(2t+1)*(2p+1)$, which gives $N\_4=4139*3947=16336633$. In column 143, based on the numerical values in column 142, the first Euler Totient Function is $\phi(N\_0)=2pq=2*1973*2003=7903838$, the second Euler Totient function is given by $\phi(N\_1)=2qr=2*2003*2039=8168234$, the third Euler Totient function is given by $\phi(N\_2)=2rs=2*2039*2063=8412914$, the fourth Euler Totient function is given by $\phi(N\_3)=2st=2*2063*2069=8536694$, and the final Euler Totient function is given by $\phi(N\_4)=2tp=2*2069*1973=8164274$. The encryption exponents $E\_0, E\_1, E\_2, E\_3,$ and $E\_4$ are selected as 47, 53, 59, 61, and 67 respectively and were chosen from the permissible range of prime-numbers between 1 and the Euler Totient function $(1)(N)$. Each encryption exponent has been verified to be co-prime with respect to its Euler Totient function, meaning that the Euler Totient function is not an integer multiple of the encryption exponent. It should be noted that encryption exponents $E\_0, E\_1, E\_2, E\_3,$ and $E\_4$ could have all been chosen to be equal. Also, the encryption exponents $E\_0, E\_1, E\_2, E\_3,$ and $E\_4$ could have been chosen in decreasing magnitude rather than increasing magnitude. Lastly, the encryption exponents $E\_0, E\_1, E\_2, E\_3,$ and $E\_4$ could have been randomly picked from the permissible range of prime-numbers between 1 and the Euler Totient function $\phi(N)$.

Finally, FIG. 13 illustrates decryption exponents D in column 145. The decryption exponents are calculated from the equation $D*E=1 \mod[\phi(N)]$. The solution to this equation is obtained by solving the Diophantine equation $E*D-\phi(N)*Y=1$, where Y is a dummy non-negative integer variable and D is the unknown decryption exponent to be solved for. The values of decryption exponents $D\_0, D\_1, D\_2, D\_3,$ and $D\_4$ were calculated by use of this Diophantine equation, which resulted in the decryption exponents of $D\_0=5045003,$ $D\_1=1232941,$ $D\_2=5418487,$ $D\_3=7836965,$ and $D\_4=7433145,$ respectively. The numerical examples in FIG. 13 are in decimal rather than hexadecimal, for ease of calculation and checking. The calculation of decryption exponent $D\_0=5045003$ is now explained in greater detail. The goal is to solve the Diophantine equation $47*D\_0-7903838*Y=1$ for decryption exponent $D\_0$ and dummy variable Y, where $E\_0=47$ and $\phi(N\_0)=7903838$. The dummy variable Y is given by this equation: $Y=-17-47K$. Setting dummy variable $K=-1$ gives the dummy variable Y the smallest possible non-negative value of $Y=30$. The value of the decryption exponent $D\_0$ associated with $K=-1$ is $D\_0=-2858835-7903838K=5045003$. Since $E\_0=47$, we have $47*D\_0=237115141=1 \mod(7903838)$, thus checking our combination of encryption exponent $E\_0=47$, decryption exponent $D\_0=5045003$, and the Euler Totient function $\phi(N\_0)=7903838$. Another check is $E\_0*D\_0-\phi(N\_0)*Y=47*5045003-7903838*30=1$, as desired. The calculation of decryption exponent $D\_1=1232941$ is now explained in greater detail. The goal is to solve the Diophantine equation $53*D\_1-8168234*Y=1$ for decryption exponent $D\_1$ and dummy variable Y, where $E\_1=53$ and $\phi(N\_1)=8168234$. The dummy variable Y is given by this equation: $Y=8-53K$. Setting the dummy variable K to zero gives the dummy variable Y the smallest possible non-negative value of $Y=8$. The value of the decryption exponent $D\_1$ associated with $K=0$ is $D\_1=1232941-8168234K=1232941$. Since $E\_1=53$, we have $53*D\_1=65345873=1 \mod(8168234)$, thus checking our combination of encryption exponent $E\_1=53$, decryption exponent $D\_1=1232941$, and Euler Totient function $\phi(N\_1)=8168234$. Another check is $E\_1*D\_1-\phi(N\_1)*Y=53*1232941-8168234*8=1$, as desired. The calculation of decryption exponent $D\_2=5418487$ is now explained in greater detail. The goal is to solve the Diophantine equation $59*D\_2-8412914*Y=1$ for decryption exponent $D\_2$ and dummy variable Y, where $E\_2=59$ and $4(N\_2)=8412914$. The dummy variable Y is given by this equation: $Y=-21-59K$. Setting dummy variable $K=-1$ gives the dummy variable Y the smallest possible non-negative value of $Y=38$. The value of the decryption exponent $D\_2$ associated with $K=-1$ is $D\_2=-2994427-8412914K=5418487$. Since $E\_2=59$, we have $59*D\_2=319690733=1 \mod(8412914)$, thus checking our combination of encryption exponent $E\_2=59$, decryption exponent $D\_2=5418487$, and the Euler Totient function $\phi(N\_2)=8412914$. Another check is $E\_2*D\_2-\phi(N\_2)*Y=59*5418487-8412914*38=1$, as desired. The calculation of decryption exponent $D\_3=7836965$ is now explained in greater detail. The goal is to solve the Diophantine equation $61*D\_3-8536694*Y=1$ for decryption exponent $D\_3$ and dummy variable Y, where $E\_3=61$ and $\phi(N\_3)=8536694$. The dummy variable Y is given by this equation: $Y=-5-61K$. Setting the dummy variable $K=-1$ gives the dummy variable Y the smallest possible non-negative value of $Y=56$. The value of the decryption exponent $D\_3$ associated with $K=-1$ is $D\_3=-699729-8536694K=7836965$. Since $E\_3=61$, we have $61*D\_3=478054865=1 \mod$ (8536694), thus checking our combination of encryption exponent E_3=61, decryption exponent D_3=7836965, and Euler Totient function is φ(N_3)=8536694. Another check is E_3*D_3−φ(N_3)*Y=61*7836965−8536694*56=1, as desired. The calculation of decryption exponent D_4=7433145 is now explained in greater detail. The goal is to solve the Diophantine equation 67*D_4−8164274*Y=1 for decryption exponent D_4 and dummy variable Y, where E_4=67 and φ(N_4)=8164274. The dummy variable Y is given by this equation: Y=−6−67K. Setting the dummy variable K=−1 gives the dummy variable Y the smallest possible non-negative value of Y=61. The value of the decryption exponent D_4 associated with K=−1 is D_4=−731129−8164274K=7433145. Since E_4=67, we have 67*D_4=498020715=1 mod(8164274), thus checking our combination of encryption exponent E_4=67, decryption exponent D_4=7433145, and Euler Totient function is φ(N_4)=8164274. Another check is E_4*D_4−φ(N_4) *Y=67*7433145−8164274*61=1, as desired. The specific numerical examples in FIG. 13 are not limiting to this application, and they only serve to illustrate the encryption and decryption processes, and the importance of the encryption-modulus "N," the product of two prime numbers, in each and every step in the processes of encryption and decryption. Additionally, the contents of FIG. 13 may be calculated in advance and stored in one or more proprietary computer systems, such as in storage 76 in FIG. 15, so any potential hackers have no knowledge as to what encryption exponents and decryption exponents are being used when dual hash-digest and encrypted blockchained blocks are transmitted across a network, such as network 70 in FIG. 15.

Figure 14:
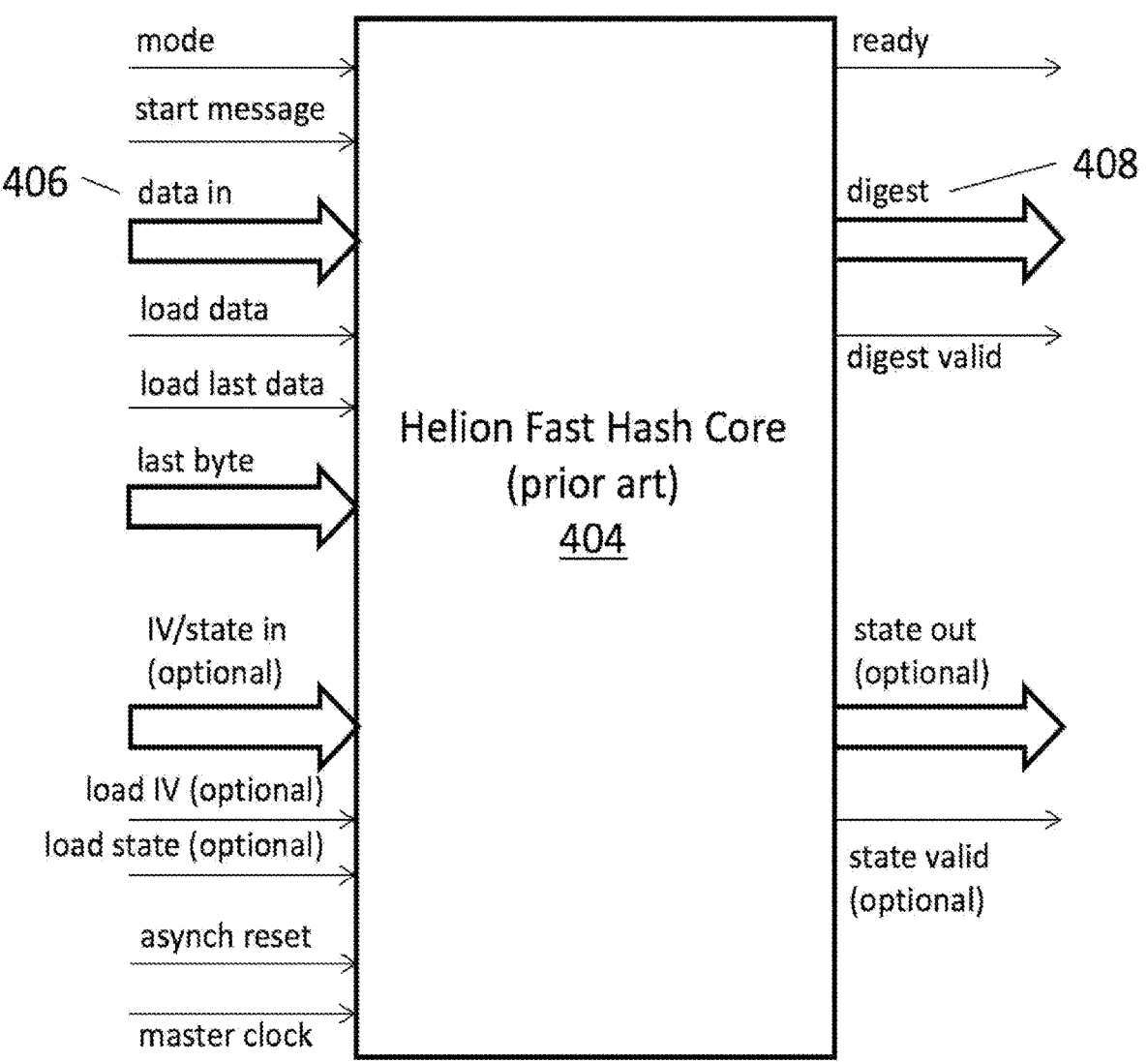
FIG. 14 illustrates a block diagram of an ASIC hash-digest processor.

FIG. 14 illustrates a block diagram of an ASIC hash-digest processor 404 also shown in FIG. 15. Hash processor 404 is configured to compute hash-digests with a hash algorithm. FIG. 14 is a prior-art diagram of the Helion Technology Fast Hash Core Application Specific Integrated Circuit (ASIC) 404, which may be resident in a computer, such as computer 10 in FIG. 15. The Helion Fast Hash Core family implements the NIST approved SHA-1, SHA-224, SHA-256, SHA-384 and SHA-512 secure hash algorithms to FIPS 180-3 and the legacy MD5 hash algorithm to RFC 1321. These are high performance cores that are available in single or multi-mode versions and have been designed specifically for ASIC. Data to be blockchained, such as the message data for data blockchain blocks 12, 14, 16, and 18 or the prime numbers in public key encryption blockchain blocks 22, 24, 26, 28, and 30, can be fed into this ASIC at 406 and the resulting blockchain hash-digest output is 408 providing a cryptographic hash digest. Such dedicated hash core ASICs have faster performance than software running in a cloud, or computer memory under an operating system.

FIG. 15 schematic diagram of a distributed computer network 10 interacting with a slider application 47 for distribution and storage of a blockchain zipper encrypted package 8. A blockchain zipper encrypted package 8 is shown in dashed line including a data blockchain 10 formed of data blockchain blocks 12, 14, 16, and 18. The data blockchain 10 is encrypted with keys formed from public key encryption blockchain 20. The keys 32, 34, 36, and 38 may also form a part of the blockchain zipper encrypted package 8. In process 1000 shown in FIG. 10, a slider application 47 is used to distribute the blockchain zipper encrypted package 8 onto distributed network 70. Slider application 47 is a software application configured to manage blockchain zipper encrypted package 8. Slider application 47 operates on computer 10 through the operating system functioning on computer 10. Computer 10 includes a hash-digest blockchain software application that generates hash digests for computation of the hash digests for forming blockchains 10 and 20. Computer 10 also includes hash ASIC 404 that may interact with hash digest blockchain application 46. Computer 10 is in communication with storage 76 that stores information such as data blockchain 10, public key encryption blockchain 20, and tables 130 and 140. Computer 10 may compute or lookup the modulus N, Euler's Totient Function, Encryption Exponent E, and Decryption Exponent D. Computer 10 is in bi-directional communication with distributed network 70. Distributed network 70 is formed of nodes 72. In a preferred embodiment, data blockchain 10 is stored on separate nodes than those that are used for storage of public key encryption blockchain 20. Slider application 47 accesses a blockchain zipper encrypted package 8 and unzips the package 8 to separate the data blockchain 10 from the public key encryption blockchain 20. The data blockchain 10 and public key encryption blockchain 20 are stored on different nodes 72 of the distributed network 70. Distributed network 70 may include the ability to communicate and access Network Attached Storage (NAS) 86, a mobile computing device 84 through a cellular tower or WIFI 74, as well as over a satellite 80 through a link 82 to a satellite dish 78 coupled to the network 70. Note that computer 10 includes a cellular/ WIFI radio connection 74 and a satellite antenna 78 to communicate with a satellite via link 82. These other connections allow for the data blockchain 10 and public key encryption blockchain 20 to be transmitted on separate communications links to recipients like cell phone 84, or for storage on nodes 72 of network 70.

FIG. 16 illustrates a flowchart depicting a process 3000 for storage of a blockchain zipper encrypted package 8 on a distributed network 70 as depicted in FIG. 15. Process 3000 is executed by slider application 47 on computer 10. Process 3000 begins with START 3002 in order to store a blockchain zipper encrypted package onto a distributed network 70. In step 3004, a data blockchain 10 is encrypted with a public key encryption blockchain 20 block by block forming a blockchain zipper encrypted package 8. In step 3006, the data blockchain 10 is separated from the public key encryption blockchain 20. In step 3008, slider application 47 transmits the data blockchain 10 to the distributed network for storage on one or more nodes 72 on a communications channel separate from the communications channel used to transmit public key encryption blockchain 20. In step 3010, distributed network 70 stores data blockchain 10 on nodes 72 that are separate from the nodes 72 that store public key encryption blockchain 20. The process ENDS in step 3012.

Figure 17:
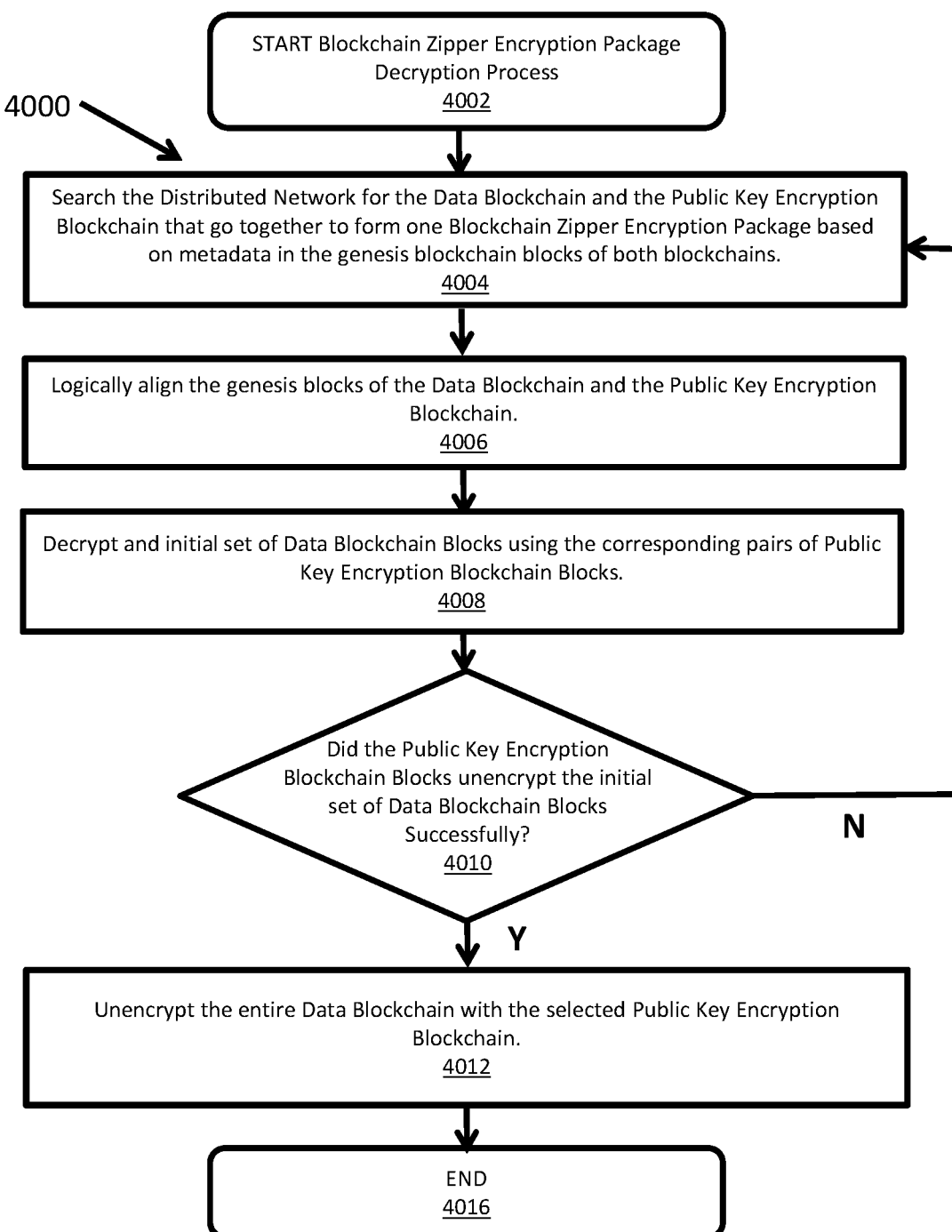
FIG. 17 illustrates a flowchart depicting a process for decryption of a blockchain zipper encrypted package.

FIG. 17 illustrates a flowchart depicting a process 4000 for decryption of a blockchain zipper encrypted package 8. Process 4000 may be performed by slider application 47. The process to decrypt the blockchain zipper encryption package begins with START 4002. In step 4004, the distributed network 70 is searched to locate the storage locations of data blockchain 10 and the public key encryption blockchain 20 that encrypted the data blockchain 10 based upon metadata in the genesis blockchain blocks 12 and 22 of each blockchain 10 and 20. In step 4006, data blockchain 10 and public key encryption blockchain 20 are logically aligned based upon the genesis blockchain blocks 12 and 22. In step 4008, an initial set of data blockchain blocks is decrypted using pairs of public key encryption blockchain blocks. Step 4010 confirms whether or not the initial set of data blockchain blocks was successfully decrypted. If it was not successfully decrypted, the process returns to step 4004 to locate the proper data blockchain 10 or public key encryption blockchain 20. If it was successfully decrypted the process goes to step 4012 where the entire data block-chain is decrypted. The process ENDS in step 4016.

FIG. 18 illustrates a metadata wrapper 100 for blockchain blocks in data blockchain 10 or public key encryption blockchain 20. Metadata wrapper 100 includes blockchain information 102 such as a block identifying identity. For genesis blockchain blocks, the blockchain formation includes interlinking metadata connecting a particular data blockchain 10 with a particular public key encryption block-chain 20 that was used to encrypt it. Wrapper 100 also includes an identification of the type of hash digest used to encrypt the blockchain block in column 104. In column 106, the computer hash digests of the particular blockchain block are stored. In column 108, metadata about the data that is contained within the blockchain block is stored such as file names.

FIG. 19 illustrates a collision between two blockchain data blocks B1 and B2 based upon the cryptographic hash digests of those two blocks which is subsequently identified and potentially avoided by also comparing the encryptions of those same two blocks. A birthday attack is a type of cryptographic attack that exploits mathematical collisions that result when different messages are hashed by a hash algorithm, but produce the same hash digest, which can render computer security systems vulnerable to hacking. Currently, RSA digital signatures utilize a single hash digest. As demonstrated in FIG. 19, blockchain data block B1 and blockchain data block B2 produce collisions when hashed with MD5. A single hash digest proved insufficient to distinguish between these different blockchain blocks. However, subsequently utilizing encryption on both blockchain data block B1 and blockchain data block B2 identified the collision between those data blocks with the hash digests and showed that blockchain data blocks B1 and B2 are in fact different because the encryption of those two blocks were different. Thus, it is possible to compare blockchain blocks that appear identical based upon identical hash digests and determine whether they are in fact different and a potential birthday attack by subsequently comparing the encryption of those two blockchain data blocks. FIG. 19 illustrates a two-column table 1900 that illustrates a potential birthday attack based upon two blockchain data blocks B1 and B2. Table 1900 includes a first column 1901 that has descriptors of various data files along with the hexadecimal value of those data files in column 1902. FIG. 19 illustrates a collision between blockchain data block B1 1903 with hexadecimal contents 1904 and blockchain data block B2 1905 with hexadecimal contents 1906. Note that blockchain data block B1 1903 has hexadecimal contents 1904 that are different from the hexadecimal contents 1906 of blockchain data block B2 1905 highlighted by showing the different hexadecimal numbers in larger BOLD font. However, when blockchain data block B1 1903 and blockchain data block B2 1905 are both hashed with the MD5 hash algorithm, both blockchain data block B1 1903 and blockchain data block B2 1905 produce the same hash digest 1907 with contents 1908. In spite of the fact that blockchain data block B1 1903 and blockchain data block B2 1905 both have different contents 1904 and 1906, the hash algorithm MD5 creates the same hash digest 1908 for both blockchain data block B1 1903 and blockchain data block B2 1905. The common hash digest 1908 indicates an undesirable collision, where different data has the same hash digest. However, the encryption of blockchain block B1 1909 has base 64 contents 1910 which are different from the encryption of blockchain block B2 1911 with base 64 contents 1912. Thus, the MD5 collision of blockchain blocks B1 and B2 is resolved via the differing encryption results 1910 and 1912. Here, the encryption of blockchain blocks B1 1903 and B2 1905 produce different encryption results 1910 and 1912 showing that blockchain blocks B1 1903 and B2 1905 are in fact different. The differences between the hexadecimal encryption results of 1910 and 1912 are shown highlighted in larger BOLD font. Thus, when two blockchain blocks 1903 and 1905 produce the same hash digest 1908, it is possible to determine whether those blockchain blocks 1903 and 1905 are identical copies or are different based upon a subsequent comparison of the encryption of those blockchain blocks 1903 and 1905. The fact that the encryption of blockchain blocks 1903 and 1905 is different shows that the hash digest resulted from a collision occurring in the MD5 hash algorithm and not because both blockchain blocks 1903 and 1905 were the same. If two blockchain blocks had the same hash digest and the same encryption result, those two blockchain blocks would be identical copies of each other. However, where two blockchain blocks 1903 and 1905 produce the same hash digest, but different encryption results 1910 and 1912, the different encryption results 1910 and 1912 shows that a collision occurred in the use of the hash algorithm. The fact that a collision occurred shows that a third party may be engaging in a potential birthday attack through the use of two different blockchain blocks that produce the same hash digest as shown in FIG. 19 through blockchain blocks 1903 and 1905.

Figure 20:
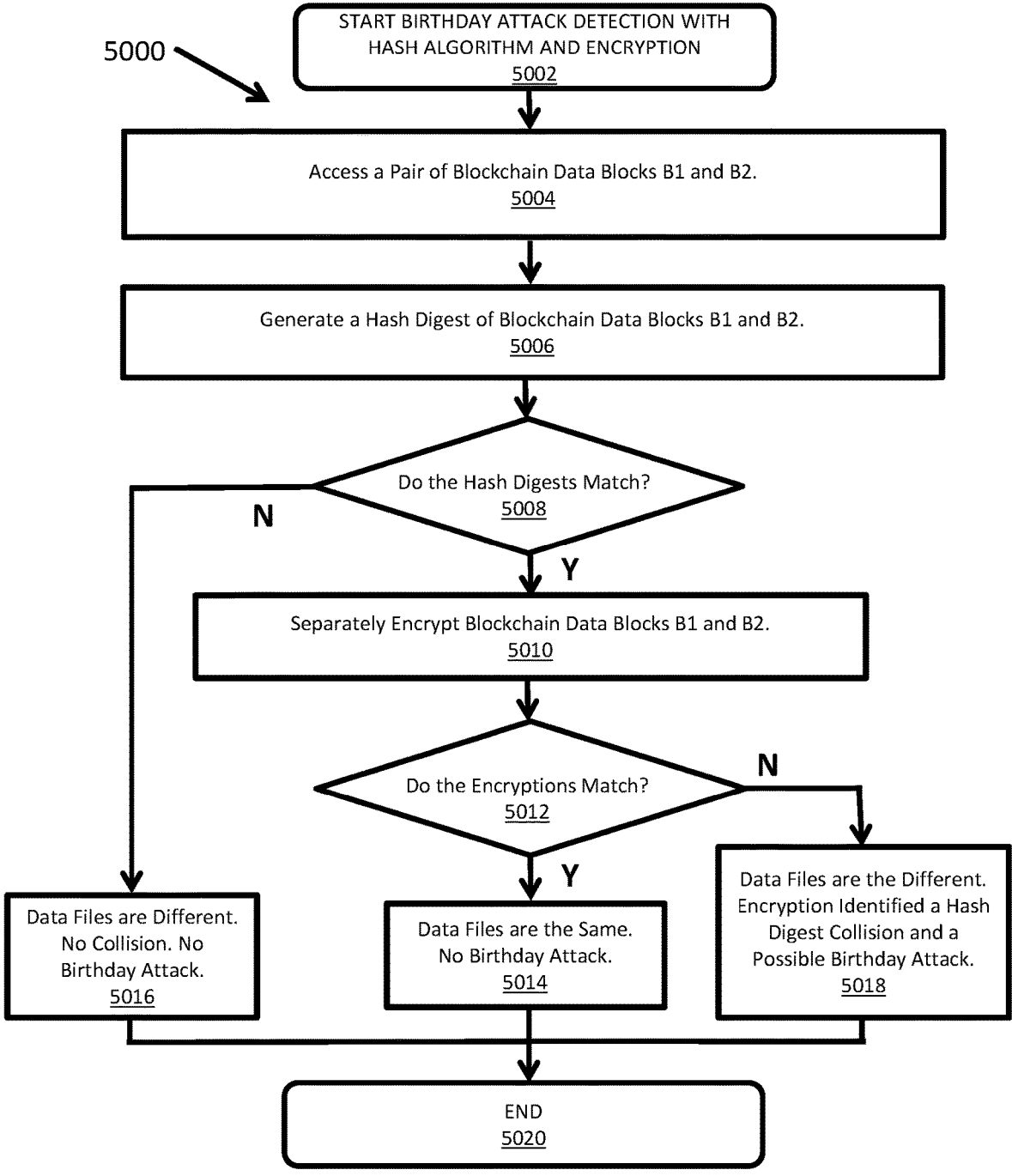
FIG. 20 illustrates a flow chart depicting a process for detecting birthday attacks utilizing hash digests and blockchain block encryption.

FIG. 20 illustrates a flowchart depicting a process 5000 for detecting birthday attacks utilizing hash digests and blockchain block encryption. The process 5000 for detecting birthday attacks utilizing hash digests and blockchain block encryption begins with START in step 5002. In step 5004, a pair of blockchain blocks B1 and B2 are accessed from storage on a node of a distributed network. In step 5006, a hash algorithm is used separately on blockchain blocks B1 and B2 to create separate hash digests for blockchain blocks B1 and B2. If the hash digests of blockchain blocks B1 and B2 are in fact different as determined in step 5008, then blockchain blocks B1 and B2 are identified as different blockchain blocks in step 5016 and the process ENDS in step 5020. When the hash digests of blockchain blocks B1 and B2 are different, there is no collision. A collision arises only when two different blockchain blocks produce hash digests that are the same. If the hash digests of blockchain blocks B1 and B2 are determined to be the same in step 5008, then there is the possibility that either blockchain blocks B1 and B2 are identical, or there is the possibility that blockchain blocks B1 and B2 are different and that a collision occurred. To determine if blockchain blocks B1 and B2 are identical or are different, the process proceeds to step 5010 where blockchain blocks B1 and B2 are separately encrypted. In step 5012, process 5000 determines if the encryptions of blockchain blocks B1 and B2 are the same, or whether they are different. If the encryptions of blockchain blocks B1 and B2 are the same, process 5000 determines that blockchain blocks B1 and B2 are identical in step 5014 and the process ENDS in step 5020. When blockchain blocks B1 and B2 are the same, process 5000 determines that there was no collision in step 5006 and 5008 because the blockchain blocks B1 and B2 were identical. However, if process 5000 determines that blockchain blocks B1 and B2 have different encryptions in step 5012, then process 5000 determines that a collision occurred in the application of the hash algorithm to blockchain blocks B1 and B2 resulting in both of those blockchain blocks having the same hash digest as illustrated in FIG. 19. The presence of a collision is indicative of a potential birthday attack occurring. The process ENDS in step 5020. Process 5000 is performed by slider application 47 utilizing ASIC 404 on computer 10.

While one or more embodiments of the present invention have been illustrated in detail, one of ordinary skill in the art will appreciate that modifications and adaptations to those embodiments may be made without departing from the scope of the present invention as set forth in the following claims.

The invention claimed is:

1. A non-volatile computer tangible medium for a block-chain zipper encrypted package for protecting blockchain data with public key encryption, comprising:
    a data blockchain formed of a plurality of data blockchain blocks that contain data for encryption; and
    a public key encryption blockchain formed of a plurality of public key blockchain blocks that contain prime numbers for encrypting the data blockchain blocks, wherein the combination of the data blockchain and the public key encryption blockchain forms a blockchain zipper encrypted package, wherein sequential pairs of adjacent public key blockchain blocks from the public key encryption blockchain encrypt individual data blockchain blocks in sequential order on the data blockchain, wherein each public key blockchain block provides one prime number used to encrypt a data blockchain block, thereby requiring a pair of adjacent public key blockchain blocks to provide a pair of prime numbers for public key encryption of one data block-chain blocks.

2. The non-volatile computer tangible medium for a blockchain zipper encrypted package for protecting block-chain data with public key encryption of claim 1, wherein each public key blockchain block contains a single prime number used for encryption of the data blockchain blocks, wherein three sequential public key blockchain blocks are required to separately encrypt two sequential data block-chain blocks, wherein the three sequential public key block-chain blocks form two different adjacent pairs of public key encryption blockchain blocks.

3. The non-volatile computer tangible medium for a blockchain zipper encrypted package for protecting block-chain data with public key encryption of claim 2, wherein the three sequential public key encryption blockchain blocks provide two different pairs of prime numbers to separately encrypt the data blockchain blocks by reusing a prime number from a public key encryption blockchain block in the middle of the three sequential public key blockchain blocks to form two different keys.

4. The non-volatile computer tangible medium for a blockchain zipper encrypted package for protecting block-chain data with public key encryption of claim 1, wherein each public key blockchain block contains two or more prime numbers used to encrypt data blockchain blocks except for a genesis blockchain block and a terminating blockchain block that both contain a single prime number, wherein each public key blockchain block provides one of two prime numbers used to encrypt one data blockchain block that is not reused for encryption of other adjacent data blockchain blocks.

5. The non-volatile computer tangible medium for a blockchain zipper encrypted package for protecting block-chain data with public key encryption of claim 1, wherein the public key encryption blockchain logically meshes with the data blockchain in an interleaved zipper format such that pairs of adjacent sequential public key encryption block-chain blocks straddle each sequential data blockchain block that is encrypted by them.

6. The non-volatile computer tangible medium for a blockchain zipper encrypted package for protecting block-chain data with public key encryption of claim 1, wherein the data blockchain is encrypted by having each of its constituent blockchain blocks individually encrypted by a different key that is formed from prime numbers stored within different pairs of adjacent public key encryption blockchain blocks.

7. The non-volatile computer tangible medium for a blockchain zipper encrypted package for protecting block-chain data with public key encryption of claim 1, wherein the entire data blockchain is encrypted by the public key encryption blockchain, wherein the data blockchain has one blockchain block less than the public key encryption block-chain so that each and every data blockchain block may logically interlock with and get encrypted by a sequential pair of public key blockchain blocks.

8. The non-volatile computer tangible medium for a blockchain zipper encrypted package for protecting block-chain data with public key encryption of claim 5, wherein the public key encryption blockchain can decrypt the entire data blockchain when it is aligned with the data blockchain such that each pair of adjacent public key blockchain blocks can decrypt the data blockchain block straddled by that pair of adjacent public key blockchain blocks.

9. The non-volatile computer tangible medium for a blockchain zipper encrypted package for protecting block-chain data with public key encryption of claim 1, wherein each public key encryption blockchain block contains a single prime number that may be used twice to encrypt two adjacent data blockchain blocks that straddle each public key blockchain block except for a prime number contained in a genesis block and a prime number contained in a terminating block of the public key encryption blockchain which are both used only once.

10. The non-volatile computer tangible medium for a blockchain zipper encrypted package for protecting block-chain data with public key encryption of claim 1, wherein each public key blockchain block contains a pair of prime numbers except for a genesis blockchain block and a ter-minating blockchain block that both contain a single prime number, wherein each prime number is used to encrypt one data blockchain block and is not reused to encrypt adjacent data blockchain blocks.

11. The non-volatile computer tangible medium for a blockchain zipper encrypted package for protecting block-chain data with public key encryption of claim 1, wherein after the data blockchain has been encrypted by the public key encryption blockchain, the blockchain zipper encrypted package is transmitted through two separate communica-tions channels by separating the blockchain zipper encrypted package into its two constituent blockchains, with the data blockchain being transmitted in a communication channel separate from the public encryption key blockchain.

12. A non-volatile computer tangible medium for a block-chain zipper encrypted package for protecting blockchain data with public key encryption, comprising:
    a data blockchain formed of a plurality of data blockchain blocks that contain data for encryption; and
    a public key encryption blockchain formed of a plurality of public key blockchain blocks that logically meshes with the data blockchain in an interleaved zipper format such that pairs of adjacent public key encryption block-chain blocks straddle each individual data blockchain block, wherein each public key blockchain block contains a prime number for public key encryption, wherein each data blockchain block is encrypted with a pair of prime numbers acquired from the pair of adjacent public key encryption blockchain blocks that straddle that particular data blockchain block.

13. The non-volatile computer tangible medium for a blockchain zipper encrypted package for protecting blockchain data with public key encryption of claim 12, wherein the combination of the data blockchain and the public key encryption blockchain forms a blockchain zipper encrypted package, wherein the data blockchain is encrypted block by block, wherein the data blockchain and the public key encryption blockchain are stored on separate nodes of a distributed computer network, wherein the data blockchain has one blockchain block less than the public key encryption blockchain so that each and every data blockchain block may interlock and get encrypted by a sequential pair of public key blockchain blocks.

14. The non-volatile computer tangible medium for a blockchain zipper encrypted package for protecting blockchain data with public key encryption of claim 12, wherein each public key blockchain block contains a single prime number that may be used twice to encrypt two adjacent data blockchain blocks that straddle each public key blockchain block except for a prime number contained in a genesis block and a prime number contained in a terminating block of the public key encryption blockchain that are both used only once.

15. The non-volatile computer tangible medium for a blockchain zipper encrypted package for protecting blockchain data with public key encryption of claim 13, wherein after the data blockchain has been encrypted by the public key encryption blockchain, the blockchain zipper encrypted package is transmitted through two separate communications channels by separating the blockchain zipper encrypted package into its two constituent blockchains, with the data blockchain being transmitted in a communication channel separate from the public encryption key blockchain.

16. A non-volatile computer tangible medium for a blockchain zipper encrypted package for protecting blockchain data with public key encryption, comprising:

a data blockchain formed of a plurality of data blockchain blocks that contain data for encryption; and a public key encryption blockchain formed of a plurality of public key blockchain blocks that each contain a prime number for encrypting the data blockchain, wherein sequential pairs of public key encryption blockchain blocks provide pairs of prime numbers used to sequentially encrypt the data blockchain block by block.

17. The non-volatile computer tangible medium for a blockchain zipper encrypted package for protecting blockchain data with public key encryption of claim 16, wherein each public key blockchain block contains a single prime number used for encryption of the data blockchain blocks, wherein three sequential public key blockchain blocks are required to separately encrypt two sequential data blockchain blocks, wherein the three sequential public key blockchain blocks form two different keys with prime numbers stored in adjacent pairs of public key encryption blockchain blocks.

18. The non-volatile computer tangible medium for a blockchain zipper encrypted package for protecting blockchain data with public key encryption of claim 16, wherein the three sequential public key encryption blockchain blocks provide two different pairs of prime numbers to separately encrypt the data blockchain blocks by reusing a prime number from a public key encryption blockchain block in the middle of the three sequential public key blockchain blocks to form two different keys.

19. The non-volatile computer tangible medium for a blockchain zipper encrypted package for protecting blockchain data with public key encryption of claim 16, wherein the combination of the data blockchain and the public key encryption blockchain forms a blockchain zipper encrypted package, wherein the data blockchain and the public key encryption blockchain are stored on separate nodes of a distributed computer network, wherein the data blockchain has one blockchain block less than the public key encryption blockchain so that each and every data blockchain block may logically interlock and get encrypted by a sequential pair of public key blockchain blocks.

20. The non-volatile computer tangible medium for a blockchain zipper encrypted package for protecting blockchain data with public key encryption of claim 16, wherein after the data blockchain has been encrypted by the public key encryption blockchain, the blockchain zipper encrypted package is transmitted through two separate communications channels by separating the blockchain zipper encrypted package into its two constituent blockchains, with the data blockchain being transmitted in a communication channel separate from the public encryption key blockchain.

* * * * *